(12) United States Patent
Asai et al.

(10) Patent No.: US 8,447,424 B2
(45) Date of Patent: *May 21, 2013

(54) SUBSTRATE PROCESSING SYSTEM AND GROUP MANAGEMENT SYSTEM

(75) Inventors: Kazuhide Asai, Toyama (JP); Hiroyuki Iwakura, Toyama (JP)

(73) Assignee: Hitachi Kokusai Electric Inc., Tokyo (JP)

(*) Notice: Subject to any disclaimer, the term of this patent is extended or adjusted under 35 U.S.C. 154(b) by 121 days.

This patent is subject to a terminal disclaimer.

(21) Appl. No.: 12/805,199

(22) Filed: Jul. 19, 2010

(65) Prior Publication Data

US 2010/0324718 A1    Dec. 23, 2010

Related U.S. Application Data

(63) Continuation of application No. 12/076,824, filed on Mar. 24, 2008, now Pat. No. 7,813,828.

(30) Foreign Application Priority Data

Apr. 2, 2007 (JP) .................................. 2007-096147
Feb. 12, 2008 (JP) .................................. 2008-030365

(51) Int. Cl.
*G06F 19/00* (2006.01)
*G06F 15/173* (2006.01)

(52) U.S. Cl.
USPC ........................... 700/121; 709/223; 715/736

(58) Field of Classification Search
USPC .............. 700/95, 96, 108, 121; 702/182, 187, 702/188; 715/700, 733, 734, 736, 772; 709/223, 709/224; 710/104
See application file for complete search history.

(56) References Cited

U.S. PATENT DOCUMENTS

| 6,269,279 B1 | 7/2001 | Todate et al. |
| 6,615,098 B1 | 9/2003 | Bode et al. |
| 7,047,100 B2 | 5/2006 | Kitamoto et al. |

(Continued)

FOREIGN PATENT DOCUMENTS

| JP | A-11-074170 | 3/1999 |
| JP | A-2002-312021 | 10/2002 |

(Continued)

OTHER PUBLICATIONS

Office Action dated Feb. 8, 2011 issued in Korean Patent Application No. 10-2010-0126612 (w/Translation).

(Continued)

*Primary Examiner* — Charles Kasenge
(74) *Attorney, Agent, or Firm* — Oliff & Berridge, PLC

(57) ABSTRACT

It is intended to provide a substrate processing system and a group management system enabling a more flexible and simplified structure of substrate processing apparatuses. The substrate processing system according to this invention has a plurality of substrate processing apparatuses for processing substrates and the group management system connected to the substrate processing apparatuses, and the group management system includes a structure information memory device (structure management device) for memorizing structure information, a plurality of communication devices (connection management devices) for communicating with at least one of the plural substrate processing apparatuses based on the structure information memorized in the structure information memory device, and an apparatus information storage device (data management device) connected to any of the plural communication devices based on the structure information memorized in the structure information memory device and which stores information relating to the substrate processing apparatus performing communication with the communication device.

8 Claims, 21 Drawing Sheets

U.S. PATENT DOCUMENTS

| | | |
|---|---|---|
| 7,123,980 B2 | 10/2006 | Funk et al. |
| 7,213,478 B2 | 5/2007 | Harada et al. |
| 7,280,883 B2 | 10/2007 | Kitamoto et al. |
| 7,333,867 B2 | 2/2008 | Kitamoto et al. |
| 7,395,131 B2 | 7/2008 | Funk |
| 7,460,923 B2 | 12/2008 | Kitamoto et al. |
| 7,636,608 B2 | 12/2009 | Funk et al. |
| 7,813,828 B2 * | 10/2010 | Asai et al. .................... 700/121 |
| 2002/0035447 A1 * | 3/2002 | Takahashi et al. ............ 700/121 |
| 2003/0023340 A1 | 1/2003 | Kitamoto et al. |
| 2003/0220768 A1 | 11/2003 | Perry et al. |
| 2006/0064188 A1 * | 3/2006 | Ushiku et al. .................. 700/96 |
| 2006/0206229 A1 | 9/2006 | Kitamoto et al. |
| 2006/0241803 A1 | 10/2006 | Kitamoto et al. |

FOREIGN PATENT DOCUMENTS

| | | |
|---|---|---|
| JP | 2003-059790 | 2/2003 |
| KR | A-2004-0099188 | 11/2004 |
| TW | 200625389 A | 7/2006 |

OTHER PUBLICATIONS

Apr. 19, 2010 Office Action issued in U.S. Appl. No. 12/076,824.

Taiwanese Patent Office, Notification of Examination Opinion in First Examination by Intellectual Property Office, Ministry of Economic Affairs mailed Sep. 12, 2012 in Taiwanese Patent Application No. 097110462 w/English-language Translation.

Apr. 2, 2013 Office Action issued in Japanese Patent Application No. 2008-030365 w/translation.

\* cited by examiner

SUBSTRATE PROCESSING SYSTEM 1

FIG. 9

| HARDWARE | CONNECTION DESTINATION | MAXIMUM NUMBER |
|---|---|---|
| STRUCTURE MANAGEMENT DEVICE | CONNECTION MANAGEMENT DEVICE | 8 |
| | TERMINAL DEVICE | 10 |
| CONNECTION MANAGEMENT DEVICE | STRUCTURE MANAGEMENT DEVICE | 1 |
| | DATA MANAGEMENT DEVICE | 8 |
| | TERMINAL DEVICE | 10 |
| | SUBSTRATE PROCESSING APPARATUS | 32 |
| DATA MANAGEMENT DEVICE | CONNECTION MANAGEMENT DEVICE | 1 |
| TERMINAL DEVICE | STRUCTURE MANAGEMENT DEVICE | 1 |
| | CONNECTION MANAGEMENT DEVICE | 8 |

FIG. 10

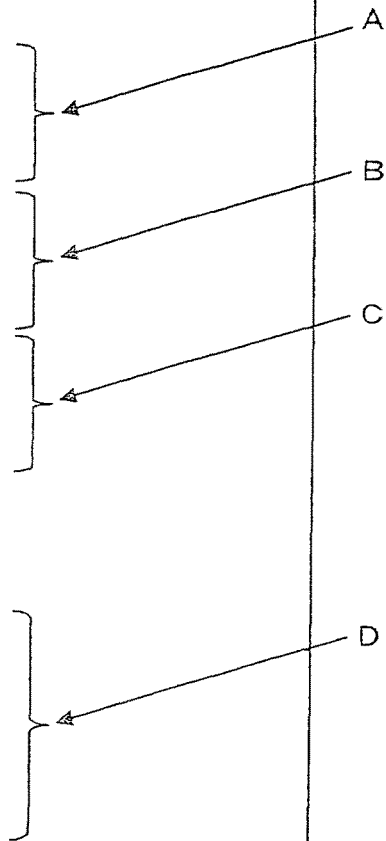

```
<!-- system information DATA -->
<sysinfo xmlns:xsi=http://www.w3.org/2001/XMLSchema-instancd
xsi:noNamespaceSchemaLocation="sysinfo.xsd">
   <ver>0.0</ver>
   <update>2005-11-21T12:00:00</update>

<!-- Node Information -->
   <nodes>
      <node node_type="GDB">                                  ─ A
         <node_name>GDB</node_name>
         <ip_addr>192.168.11.1</ip_addr>
      </node>
      <node node_type="EDS" node_id="1">                      ─ B
         <node_name>EDS#2</node_name>
         <ip_addr>192.168.11.2</ip_addr>
      </node>
      <node node_type="EDB" node_id="1">                      ─ C
         <node_name>EDB#2</node_name>
         <ip_addr>192.168.11.10</ip_addr>
      </node>
   </nodes>

<!-- EQ Information -->
   <eqs>
      <eq eq_type="system1">                                  ─ D
         <eq_name>装置1</eq_name>
         <eds_name> EDS#2</eds_name>
         <edb_name> EDB#1</edb_name>
         <eq_addr>192.168.12.1</eq_addr>
      </eq>
   </eqs>
</sysinfo>
```

STRUCTURE MANAGEMENT PROGRAM 30

OPERATION WHEN STARTING UP CONNECTION
MANAGEMENT DEVICE (S10)

OPERATION WHEN VIEWING INFORMATION RELATING TO
SUBSTRATE PROCESSING APPARATUS (S20)

SUBSTRATE PROCESSING SYSTEM AND GROUP MANAGEMENT SYSTEM

This is a Continuation of application Ser. No. 12/076,824 filed Mar. 24, 2008. This application claims the benefit of Japanese Patent Application Nos. 2007-096147 and 2008-030365, filed Apr. 2, 2007 and Feb. 12, 2008, respectively. The entire disclosures of the prior applications are hereby incorporated by reference herein in their entirety.

BACKGROUND OF THE INVENTION

1. Field of the Invention

This invention relates to a substrate processing system for processing semiconductor substrates, glass substrates and the like as well as to a group management system.

2. Description of the Related Art

The substrate processing system of this type includes a plurality of substrate processing apparatuses for performing processing on substrates and a group management apparatus for monitoring operation states of the substrate processing apparatuses and storing production history and the like. With the use of such group management apparatus, improvement in efficiency in semiconductor production is achieved.

SUMMARY OF THE INVENTION

However, in the conventional substrate processing system, there is an upper limit for the number of substrate processing apparatuses to be connected to the group management apparatus, and it is necessary to divide the substrate processing system into two sections in the case where the number of substrate processing apparatuses exceeds the upper limit. Also, since a new set of group management apparatus is required even in the case where the number of the substrate processing apparatuses exceeding the upper limit is only one, a sharp increase in cost is incurred to the end users. Further, in the case of changing the connection structure of the substrate processing apparatuses, data transition, adjustment of system parameters, and the like usually take time.

An object of this invention is to provide a substrate processing system and a group management system enabling connection with a multiple of substrate processing apparatuses without increasing the number of group management apparatus even in the case where the number of the substrate processing apparatuses increases.

In order to attain the above-described object, the substrate processing system according to this invention comprises a plurality of substrate processing apparatuses for processing substrates and a group management system connected to the substrate processing apparatuses, wherein the group management system comprises a structure information memory device for memorizing structure information defining a connection structure; a plurality of communication devices each of which performs communication with at least one of the substrate processing apparatuses based on the structure information; and an apparatus information storage device for storing information relating to the substrate processing apparatus performing communication with the communication device.

The group management system according to this invention is connected to a plurality of substrate processing apparatuses for processing substrates and comprises: a structure information memory device for storing structure information defining a connection structure of the substrate processing system; a plurality of communication devices each of which performs communication with at least one of the substrate processing apparatuses based on the structure information; and an apparatus information storage device for storing information relating to the substrate processing apparatus performing communication with the communication device.

According to the substrate processing system of this invention, since the substrate processing system has the structure information memory device for managing the connection structure of the whole system, the communication devices communicating with the substrate processing apparatuses, and the apparatus information storage device for storing information sent from the substrate processing apparatuses via the communication devices, it is possible to achieve connection with a multiple of substrate processing apparatuses without increasing the number of group management apparatus.

BRIEF DESCRIPTION OF THE DRAWINGS

FIG. 9 is a diagram showing one example of an upper limit parameter table containing hardwares and upper limits each of which indicates the number of hardwares that are connected to each of the hardwares.

FIG. 10 is a diagram showing one example of structure information memorized in a structure management device 3.

DESCRIPTION OF THE PREFERRED EMBODIMENTS

To start with, the background of this invention will be described based on FIGS. 1 and 2.

Figure 1:
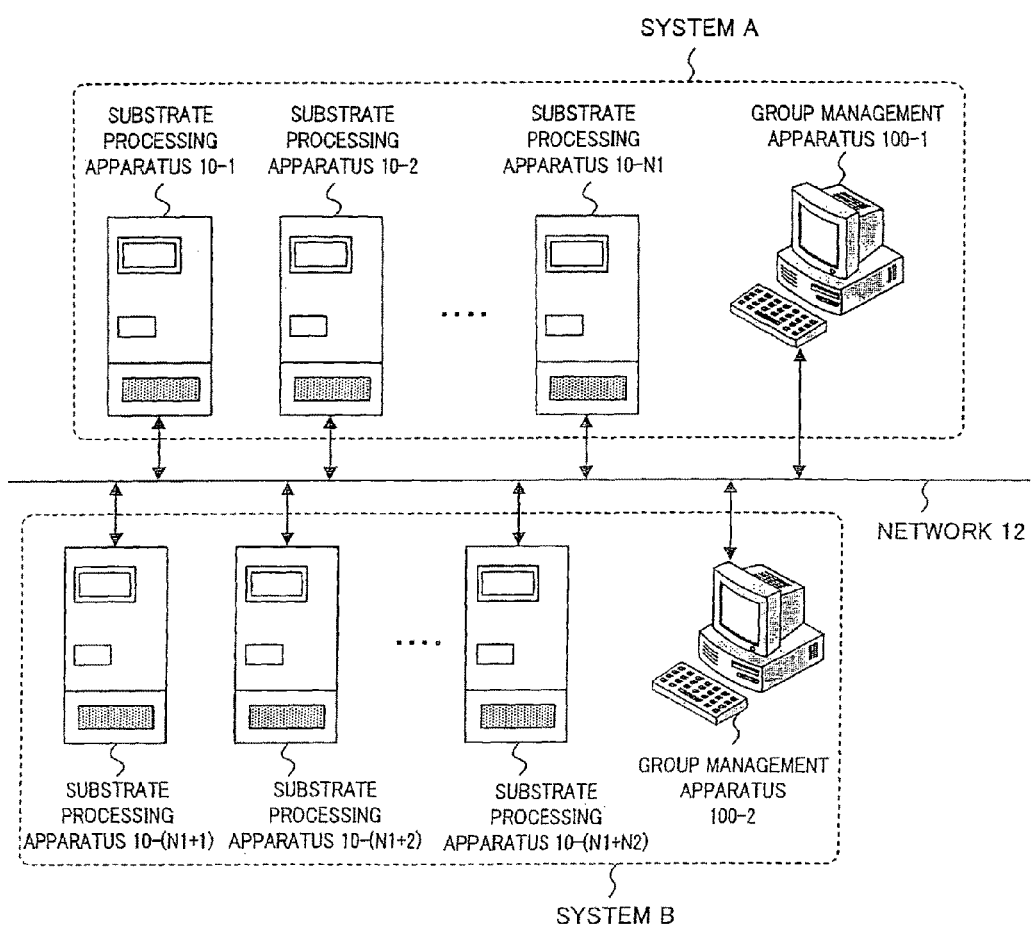
FIG. 1 is a diagram showing a structure of a substrate processing apparatus 1 including system A and system B.

FIG. 1 is a diagram showing a structure of a substrate processing system 1 including System A and System B.

As shown in FIG. 1, the substrate processing system 1 has a plurality of substrate processing apparatuses 10-1 to 10-n and a group management apparatus 100. The substrate processing apparatuses 10-1 to 10-n and the group management apparatus 100 are connected to each other via a network 12 such as a LAN or a WAN. Therefore, data are sent and received between the substrate processing apparatuses 10-1 to 10-n and the group management apparatus 100. When any of a plurality of components such as the substrate processing apparatuses 10-1 to 10-n is/are described without being specified, such component/components is/are in some cases denoted by the simple reference numeral such as the substrate processing apparatus/apparatuses 10.

The substrate processing apparatus 10 executes processing on substrates based on a process recipe and the like. Specifically, a procedure for processing substrates is described on the process recipe, and the substrate processing apparatus 10 performs control on the components inside the apparatus based on the procedure. Also, the substrate processing apparatus 10 sends data relating to operation state of the apparatus itself including temperature information, pressure information, failure information, and the like to the group management apparatus via the network 12.

The substrate processing apparatus is formed as a semiconductor production apparatus performing processing in a semiconductor device (IC) production method, for example. In the following description, one embodiment using a vertical apparatus performing oxidization and diffusion processing, CVD processing, and the like on the substrates as the substrate processing apparatus will be described.

The group management apparatus 100 receives the data sent from the substrate processing apparatus 10 and relating to the operation state of the substrate processing apparatus 10 to perform storage and display on a screen. Also, the group management apparatus 100 sends the data such as the process recipe relating to the substrate processing apparatus 10 to the substrate processing apparatus 10.

A maximum value of the number of the substrate processing apparatuses 10 to be connected has been set in the group management apparatus 100. In the case where the number of the substrate processing apparatuses 10 exceeds the maximum value, a second group management apparatus 100 is added, and the system is divided.

As shown in FIG. 1, each of System A and System B includes the group management apparatus 100 and the substrate processing apparatuses 10. System A includes one group management apparatus 100-1 and N1 substrate processing apparatuses 10-1 to 10N1, and System B includes one group management apparatus 100-2 and N2 substrate processing apparatuses 10-(N1+1) to 10-(N1+N2). For example, in the case where the maximum value of the number of the substrate processing apparatuses 10 to be connected to one group management apparatus 100 is 32, each of System A and System B includes 32 substrate processing apparatuses 10 at the maximum. In the case where the number of the substrate processing apparatuses 10 is 64, it is necessary that each of System A and System B includes 32 substrate processing apparatuses 10. Each of the systems such as System A and System B included in the substrate processing system 1 is also referred to as a subsystem.

In the case where a plurality of subsystems are included in the substrate processing system 1, the substrate processing apparatus 10 perform data transmission with the substrate processing apparatus 10 provided that these substrate processing apparatuses 10 are included in an identical subsystem. Therefore, the data are easily copied to another substrate processing apparatus 10 via the group management apparatus 100. In turn, the substrate processing apparatus 10 does not perform data transmission with the substrate processing apparatus 10 included in a different subsystem. Therefore, it is difficult for a user to perform data copying between the substrate processing apparatuses 10 included in the different subsystems. Therefore, in the case where the recipe is changed in the substrate processing apparatuses 10 of System A, there is a fear that operation rate of the substrate processing system 1 is reduced due to time consumed for reflecting the change to the substrate processing apparatuses 10 of System B.

The group management apparatus 100 displays a list of the substrate processing apparatuses 10 included in the subsystem including the group management apparatus 100. The group management apparatus 100 can not display the substrate processing apparatuses 10 included in the different subsystem as such list on the screen. Therefore, since the user cannot view at the same time the information relating to all of the substrate processing apparatuses 10 included in the substrate processing system 1, it is difficult to recognize an operation rate of the whole system. Also, it is difficult for the user to compare the substrate processing apparatuses 10 included in the substrate processing system 1.

Further, a burden is put on the user in the case of changing the structure of the substrate processing system 1. For example, in the case where one substrate processing apparatus 10 is added in the structure including the maximum number of the substrate processing apparatuses 10 in the subsystem, it is also necessary to add one group management apparatus 100. Therefore, the user has to raise a large amount of money for adding the apparatus.

Also, in the case where the substrate processing apparatus 10 is relocated to a subsystem that is different from the one in which the substrate processing apparatus 10 itself is currently included, for example, it is necessary to relocate data between the group management apparatuses 100 of the subsystems.

Figure 2:
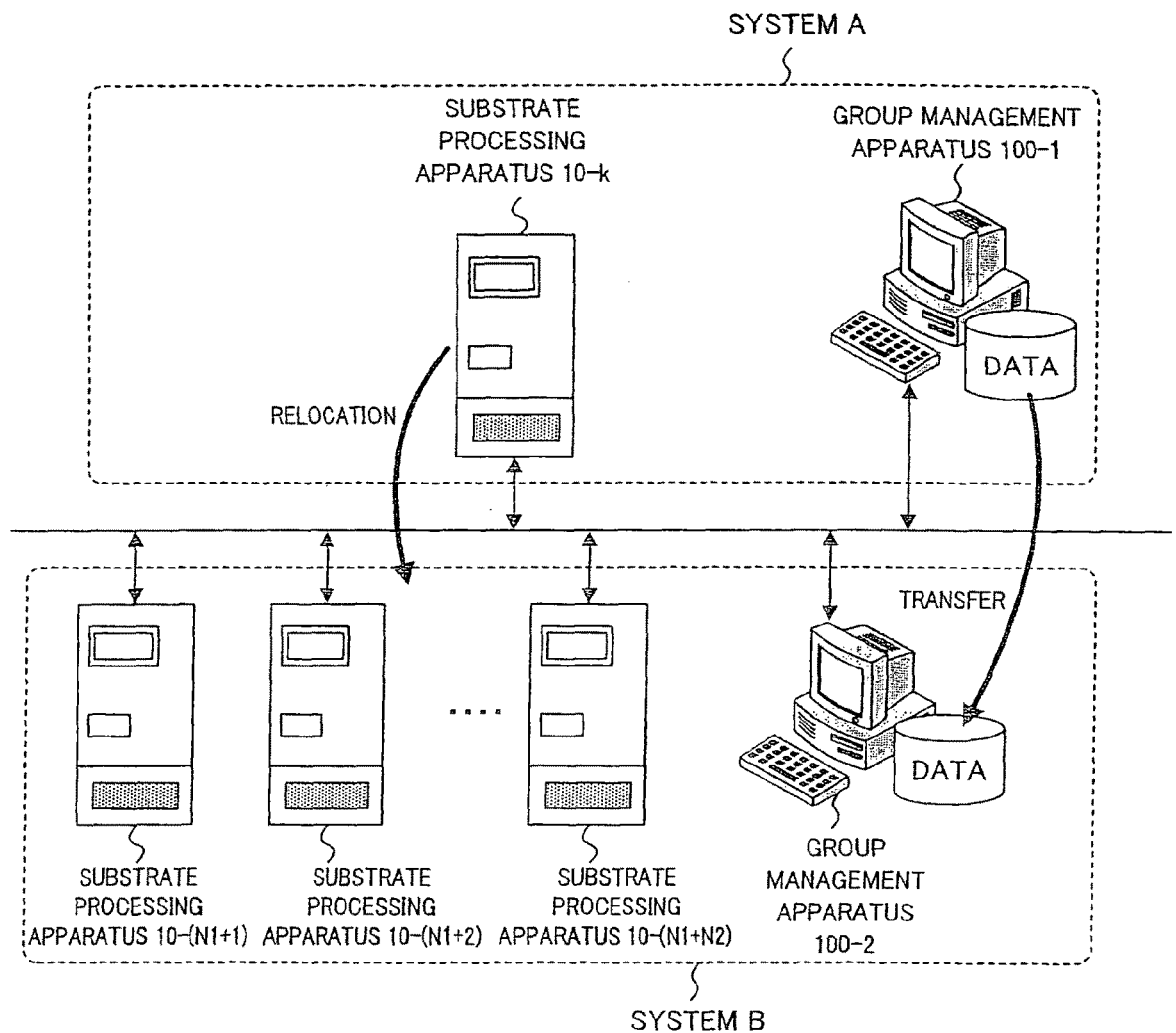
FIG. 2 is a diagram for illustrating relocation of the substrate processing apparatus 10 between different subsystems.

FIG. 2 is a diagram for illustrating the relocation of the substrate processing apparatuses 10 between different subsystems.

As shown in FIG. 2, in the case where the substrate processing apparatus 10 is relocated from System A to System B, it is necessary to transfer data relating to the substrate processing apparatus 10 from the group management apparatus 100-1 of System A to the group management apparatus 100-2 of System B. Structure information relating to the substrate processing apparatuses 10 of System B has been memorized in the group management apparatus 100-2. In addition to the structure information, it is necessary that the structure information relating to the substrate processing apparatus 10-$k$ is newly formed in the group management apparatus 100-2 to be stored in a hard disk drive (HDD). Also, since the structure information is reflected when starting up the group management apparatus 100, it is necessary to restart the group management apparatus 100-2. Therefore, the time required for the structure change work corresponds to the time required for the work of updating the structure information memorized in the group management apparatus 100-2 and the restart of the group management apparatus 100-2.

The group management apparatus 100 stores apparatus information relating to the substrate processing apparatus 10 that is included in the subsystem, such as parameters unique to the apparatus and data generated during substrate processing including logging data and the like to the hard disk drive (HDD) of the group management apparatus 100. Therefore, in the case where the substrate processing apparatus 10 is relocated to the different subsystem, the stored data are stored in the HDD of the group management apparatus 100 included in the destination subsystem. Further, in the case where the substrate processing apparatus 10 is relocated, time is consumed for adjustment of system parameters and operation confirmation. The system parameters are used for defining the structure of the substrate processing system 1 or the subsystem and include a means for connection, the number of connections, and the like of the substrate processing apparatus 10.

Hereinafter, a substrate processing system 2 according to one embodiment of this invention will be described.

Figure 3:
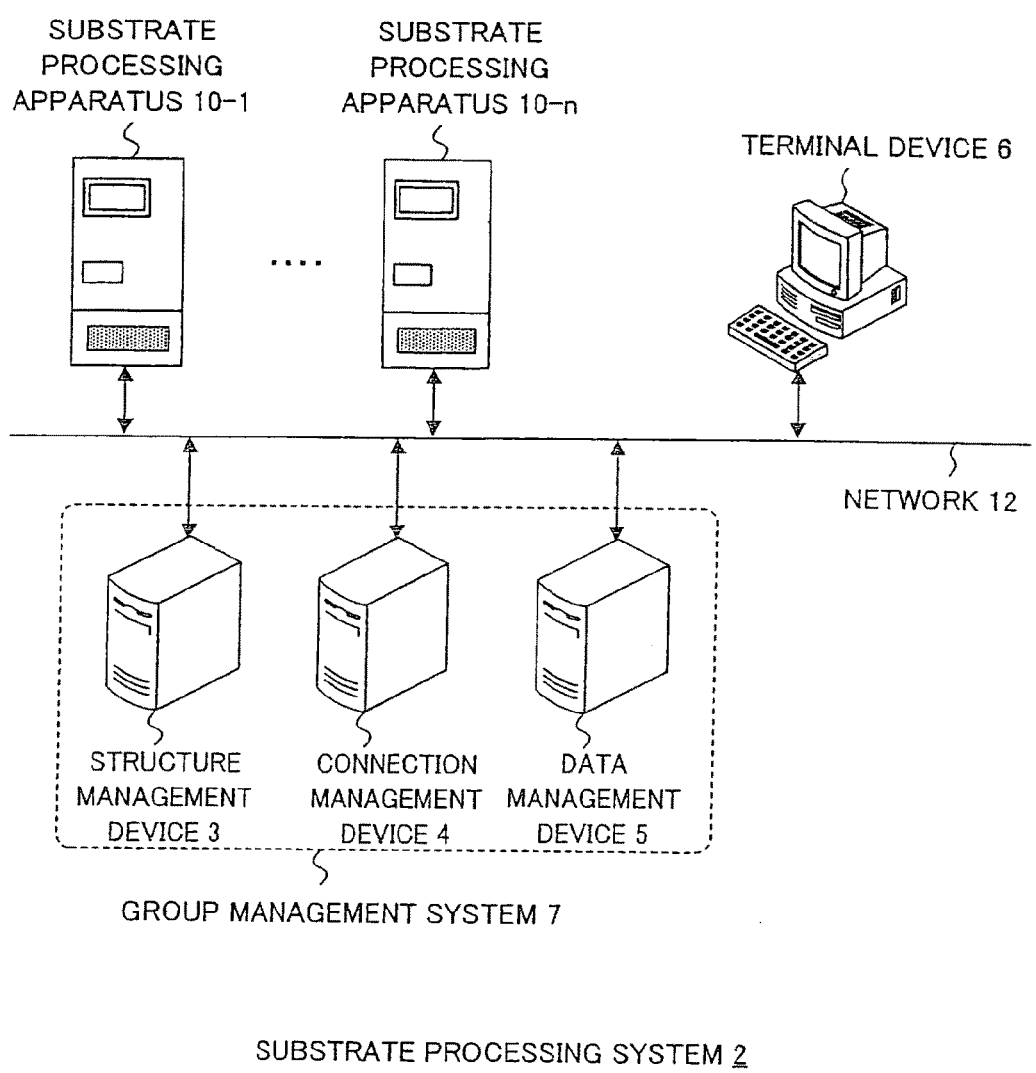
FIG. 3 is a diagram showing a structure of a substrate processing system 2 according to one embodiment of this invention.

FIG. 3 is a diagram showing a structure of the substrate processing system 2 according to one embodiment of this invention.

As shown in FIG. 3, the substrate processing system 2 has a plurality of substrate processing apparatuses 10-1 to 10-n, a terminal device 6 serving as a display unit and an instruction unit, and a group management system 7. The group management system 7 includes a structure management device 3 serving as a structure information memory device for memorizing structure information, at least one connection management device 4 serving as a communication device, and at least one data management device 5 serving as an apparatus information storage device. The substrate processing apparatus 10, the structure management device 3, the connection management device 4, the data management device 5, and the terminal device 6 are connected to one another via a network 2. In the substrate processing system 2, each of the substrate processing apparatus 10, the structure management device 3, the connection management device 4, the data management device 5, and the terminal device 6 is referred to also as a hardware. The structure management device 3, the connection management device 4, and the data management device 5 are sometimes abbreviated to GDB, EDS, and EDB, respectively.

In the group management system 7, the structure management device (GDB) 3 memorizes structure information of the substrate processing system 2. The structure information includes names of the hardwares, connection structures of the hardwares, and the like. The structure information is used by another hardware such as the connection management device 4 for recognizing a function of the hardware itself and a relationship with yet another hardware. Also, the structure management device 3 accumulates information (shared information) shared by the whole substrate processing system 2. The shared information is information hardly or never generated and information temporarily generated in the substrate processing apparatus 10, such as failure information and event information of the substrate processing apparatus 10.

The connection management device (EDS) 4 communicates with at least one of the plural substrate processing apparatuses 10 based on the structure information memorized in the structure management device 3. The connection management device 4 receives information from the substrate processing apparatus 10 and sends information relating to the substrate processing apparatus 10 to other hardwares upon reception of a request from the hardware. Upon reception of information indicating update of the structure information from the structure management device 3, the connection management device 4 sets up connection with at least one of the plural substrate processing appraises 10 and the data management device 5.

The data management device (EDB) 5 is connected to any of the plural connection management devices 4 based on the structure information memorized in the structure management device 3. The data management device 5 stores information relating to the substrate processing apparatus 10 performing communication with the connected connection management device 4. The data management device 5 acquires the data (event information and process information) sent from the substrate processing apparatus 10 to accumulate the data. The information has a high generation frequency and includes large amount of data as compared to the information accumulated in the structure management device 3 and includes temperature information, pressure information, and the like of the substrate processing apparatus 10.

The terminal device 6 forms an interface that provides information to the users by displaying the information accumulated in the hardwares on a screen. More specifically, the terminal device 6 receives a request from the user via a keyboard or a mouse and judges in which one of the hardwares the information relating to the request is accumulated to thereby display the information on the screen by acquiring information from the object hardware based on the judgment result.

Details of the structure information memorized in the structure management device 3 and a program operated on the hardware will be described later in this specification.

Hereinafter, detailed structure of the substrate processing apparatus 10 will be described.

Figure 4:
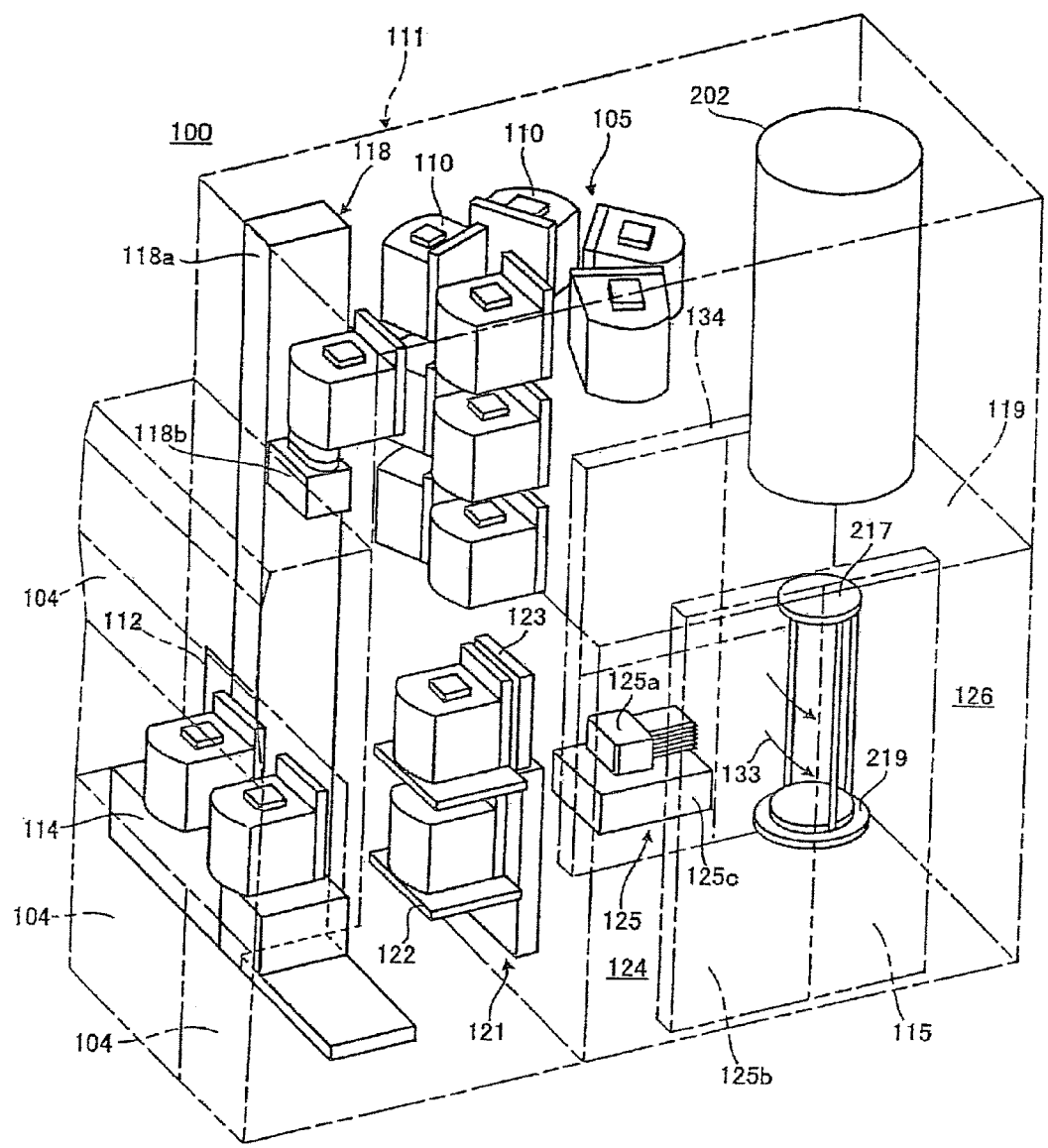
FIG. 4 is a perspective view showing a substrate processing apparatus 10 according to the embodiment of this invention.
Figure 5:
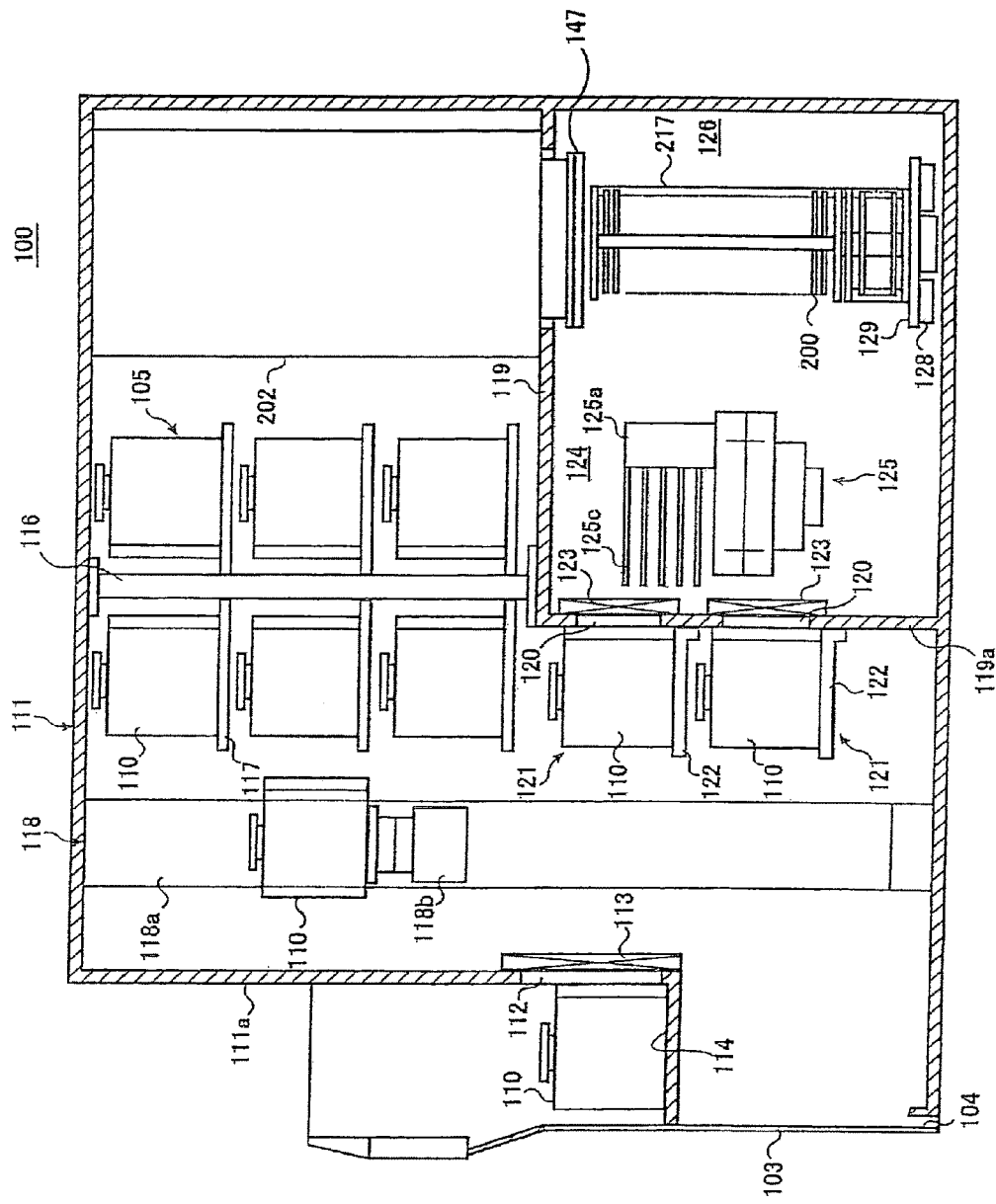
FIG. 5 is a side transparent view showing the substrate processing apparatus 10 according to the embodiment of this invention.

FIG. 4 is a perspective view showing the substrate processing apparatus 10 according to the embodiment of this invention. FIG. 5 is a side transparent view showing the substrate processing apparatus 10 shown in FIG. 4.

As shown in FIGS. 4 and 5, a housing 111 is provided in the substrate processing apparatus 10 according to the embodiment of this invention using a hoop (substrate container, hereinafter referred to as pod) 110 as a wafer carrier housing wafers (substrates) 200 made from silicon and the like. A front maintenance opening 103 serving as an opening provided for allowing maintenance is formed at a front part of the front wall 111a of the housing 111, and front maintenance doors 104 are provided for opening/closing the front maintenance opening 103.

A pod carrying in/out opening (substrate container carrying in/out opening) 112 is formed on the front wall 111a of the housing 111 for providing communication between inside and outside of the housing 111, and the pod carrying in/out opening 112 is opened/closed by a front shutter (substrate container carrying in/out gating mechanism) 113. A load port (substrate container delivery board) 114 is provided on the front part of the pod carrying in/out opening 112, and is so structured as to align pods 110 placed thereon. The pod 110 is placed on the load port 114 and carried out from the load port 114 by an in-process conveying device (not shown).

A rotational pod shelf (substrate container placing shelf) 105 is provided on an upper part at a substantially central part with respect to a front-back direction inside the housing 111, which has a structure of storing the plural pods 110. Specifically, the rotational pod shelf 105 is provided with a support column 116 that is disposed upright along a vertical direction and intermittently rotated in a horizontal plane and with a plurality of racks (substrate container placing boards) 117 that are radially supported at each of the upper, medium and lower positions thereof, and the plural racks 117 have a structure that each of the racks 117 retains each of the pods 110.

A pod conveying device (substrate container conveying device) 118 is disposed between the load port 114 and the pod shelf 105 inside the housing 111 and formed of a pod elevator (substrate container elevating mechanism) 118a capable of elevation while retaining the pod 110 and a pod conveying mechanism (substrate container conveying mechanism) 118b serving as a conveying mechanism. The pod conveying device 118 conveys the pod 110 among the load port 114, the rotational pod shelf 105, a pod opener (substrate container cover open/close mechanism) 121 by a continuous operation of the pod elevator 118a and the conveying mechanism 118b.

A sub-housing 119 extends to a rear end in the housing 111 in a lower part at a substantially central part in the cross direction of the housing 111. A pair of wafer carrying in/out openings (substrate carrying in/out openings) 120 for carrying in/out a wafer 200 to/from the sub-housing 119 is formed on a front wall 119a of the sub-housing 119, the wafer carrying in/out openings 120 being aligned along a vertical direction as two stages, and each of the upper and lower wafer carrying in/out openings 120 being provided with a pair of pod openers 121. Each of the pair of pod openers 121 is provided with a placing table 122 on which the pod 110 is placed and a cap attaching/detaching mechanism (cover attaching/detaching mechanism) 123 for attaching and detaching a cap (cover) of the pod 110. The pod opener 121 attaches and detaches the cap of the pod 110 placed on the placing table 122 by the cap detaching/attaching mechanism 123 to open and close a wafer taking in/out opening of the pod 110.

The sub-housing 119 forms a transfer chamber 124 which is fluidically isolated from a space in which the pod conveying device 118 and the rotational pod shelf 105 are installed. A wafer transfer mechanism (substrate transfer mechanism) 125 is disposed at a front region of the transfer chamber 124 and is formed of a wafer transfer device (substrate transfer device) 125a capable of rotating and directly operating the wafer 200 in a horizontal direction and a wafer transfer device elevator (substrate transfer device elevation mechanism) 125b for elevating the wafer transfer device 125a. As schematically shown in FIG. 4, the wafer transfer device elevator 125b is disposed between a right end of the pressure-resistant housing 111 and a right end of the front region of the transfer chamber 124 of the sub-housing 119. By a continuous operation of the wafer transfer device elevator 125b and the wafer transfer device 125a, the wafer 200 is loaded (charging) and unloaded (discharging) on and from a boat (substrate holder) 217 by using tweezers (substrate holding member) 125c of the wafer transfer device 125a as a placing unit of the wafer 200.

A stand-by unit 126 for housing the boat 217 for stand-by is formed in a rear region of the transfer chamber 124. A processing furnace 202 is provided above the stand-by unit 126. A lower end of the processing furnace 202 is opened and closed by a furnace shutter (furnace open/close mechanism) 147.

As schematically shown in FIG. 4, a boat elevator (substrate retaining elevation mechanism) 115 for elevating the boat 217 is disposed between a right end part of the pressure resistant housing 111 and a right end part of the stand-by unit 126 of the sub-housing 119. A sealing cap 219 serving as a cover is horizontally fixed to an arm 128 serving as a coupling member coupled to a platform of the boat elevator 115 and has a structure of vertically supporting the boat 217 and capable of closing the lower end of the processing furnace 202. The boat 217 is provided with a plurality of holding members and has a structure of horizontally retaining a plurality of (for example, about 50 to 125) wafers 200 in a state where the wafers 200 are aligned with centers thereof being kept in line with one another.

As schematically shown in FIG. 4, a clean unit 134 formed of a supply fan for supplying a clean air 113 which is a cleaned atmosphere or an inert gas and of a dust-proof filter is provided at a left end of the transfer chamber 124, which is opposite to the side at which the wafer transfer device elevator 125b and the boat elevator 115 are provided, and a notch matching device 135 serving as a substrate alignment device for aligning positions of the wafers in a circumferential direction is disposed, though not shown, between the wafer transfer device 125a and the clean unit 134.

The clean air 133 blown out from the clean unit 134 is flown to the notch matching device 135, the wafer transfer device 125a, and the boat 217 in the stand-by unit 126 and then drawn by a duct not shown to be discharged outside the housing 111 or circulated to a first side (supply side) which is a drawing side of the clean unit 134 so as to be blown out into the transfer chamber 124 again by the clean unit 134.

Hereinafter, a process module controller (PMC) 14 that is provided inside the substrate processing apparatus 10 for performing control on the devices of the substrate processing apparatus 10 will be described.

Figure 6:
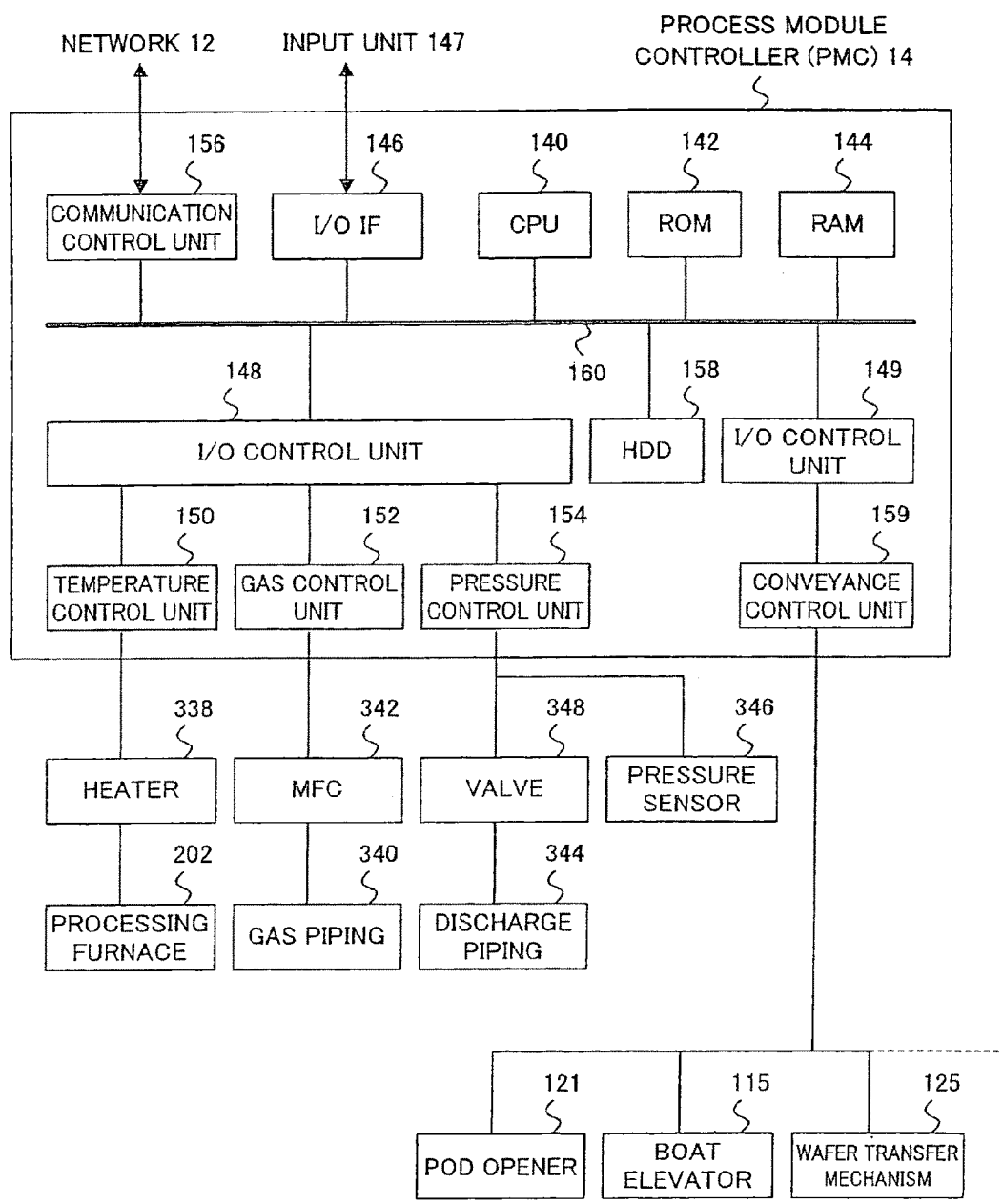
FIG. 6 is a diagram showing a function structure of the substrate processing apparatus 10 centered on a PMC 14.

FIG. 6 is a diagram showing a function structure of the substrate processing apparatus 10 centered on the PMC 14.

As shown in FIG. 6, the PMC 14 has a CPU 140, a ROM 142, a RAM 144, a hard disk drive (HDD) 158 for memorizing data, an input/output interface 146 for sending/receiving data to/from an input unit 147 including a display device such as a display, an input device such as a keyboard, a communication control unit 156 for controlling data communication with other hardwares (connection management device 4, etc.) via the network 12, and an I/O control unit 148 for controlling inputs and outputs to and from a temperature control unit 150, a gas control unit 152, a pressure control unit 154, and a temperature control unit 150, and the like. The components are mutually connected via a bus 160, and the data are inputted and outputted via the bus 160 among the components.

In the PMC 14, the CPU 140 performs processing on substrates based on a predetermined recipe. Specifically, the CPU 140 outputs control data (control command) to the temperature control unit 150, the gas control unit 152, the pressure control unit 154, and the like. Data such as a sequence program, the data inputted from the input/output IF 146, and the data inputted via the communication control unit 156 are stored in the ROM 142, the RAM 144, and the HDD 158.

The temperature control unit 150 controls a temperature inside the process chamber 202 by a heater 338 provided on an outer periphery of a processing furnace 202. The gas control unit 152 controls a supply amount and the like of a reaction gas to be supplied to the processing furnace 202 based on an output value from an MFC (mass flow controller) 342 provided on a gas piping 340 of the processing furnace 202. The pressure control unit 154 control a pressure inside the process chamber 202 by opening and closing a valve 348 based on an output value of a pressure sensor 346 provided on a discharge piping 344 of the processing furnace 202. A conveyance control unit 159 controls the conveyer system such as the pod opener 121, the boat elevator 115, and the wafer transfer mechanism 125. As described above, the controllers such as the temperature control unit 150 perform control on the units (heater 338, MFC 342, valve 348, and the like) of the substrate processing apparatus 10 based on control commands from the CPU 140.

Therefore, the CPU 140 starts up the sequence program and fetches, according to the sequence program, the commands of the recipe to be executed, so that steps in which target values and the like of the control parameters are set are sequentially performed, and that the control commands for processing substrates are sent to the temperature control unit 150, the gas control unit 152, the pressure control unit 154, and the conveyance control unit 159 via the I/O control units 148 and 149. The controllers such as the temperature control unit 150 and the like performs control on the units (heater 338, MFC 342, valve 348, and the like) of the substrate processing unit 10 in accordance with the control commands. Thus, processing on the wafers 200 is performed.

The CPU 140 sends data relating to a state of the substrate processing apparatus 10, such as temperature information and pressure information, to the connection management device 4 via the communication control unit 156. Further, the CPU 140 sends information relating to an event and a failure occurred in the substrate processing apparatus 10 and process information to the connection management device 4 in the same manner.

Figure 7:
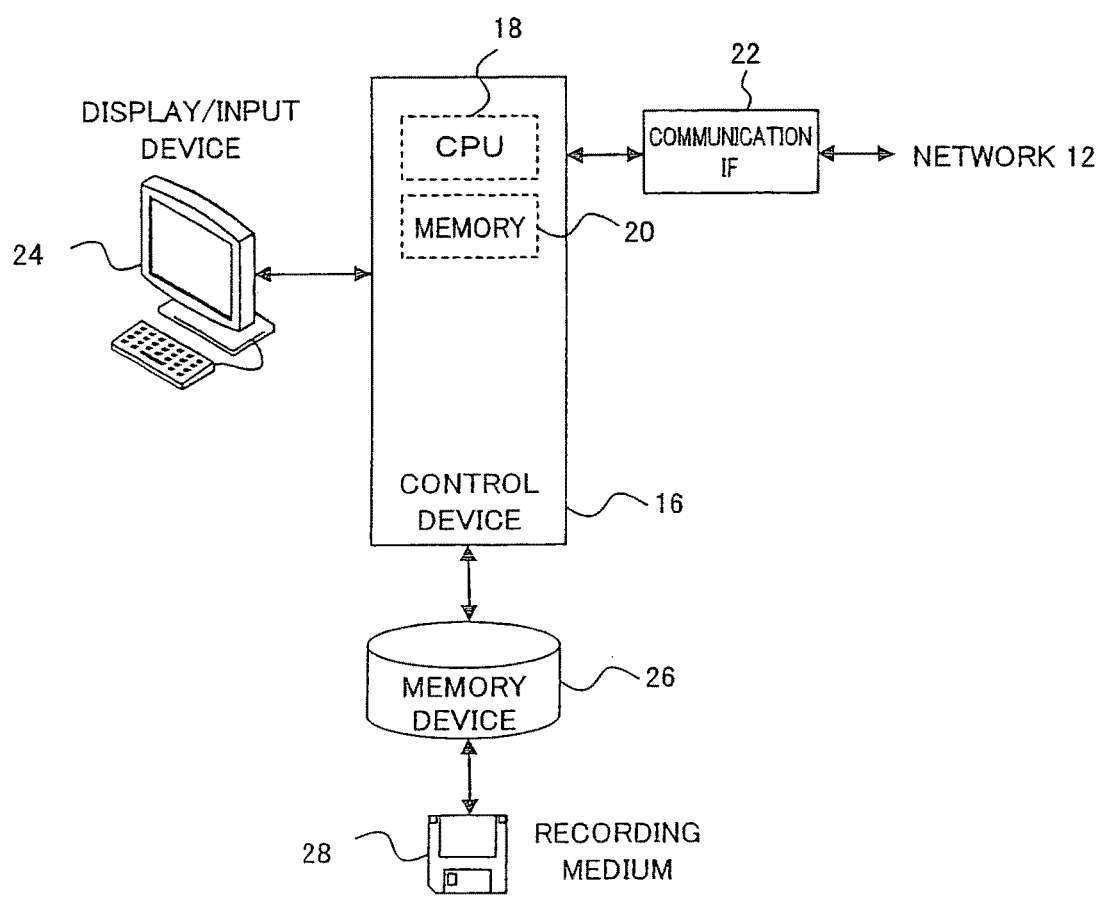
FIG. 7 is a diagram showing a hardware structure of the terminal device 6.

FIG. 7 is a diagram showing a hardware structure of the terminal device 6.

As shown in FIG. 7, the terminal device 6 has a control device 16 including a CPU 18 and a memory 20, a communication interface (IF) 22 for sending/receiving data to/from external hardwares and the like via the network 12, a memory device 26 such as a hard disk drive, and a display/input device 24 including a display device such as a liquid crystal display, a keyboard, and a pointing device such as a mouse. The structure management device 3, the connection management device 4, and the data management device 5 has the communication IF 22 and the control device 16 so that it is possible to access the display/input device 24 when so required. As described above, a structure management program 30 described later in this specification and the like are installed in the structure management device 3 and the like.

Hereinafter, hardwares performing communication with one another in the substrate processing system 2 according to this embodiment of this invention will be described.

Figure 8:
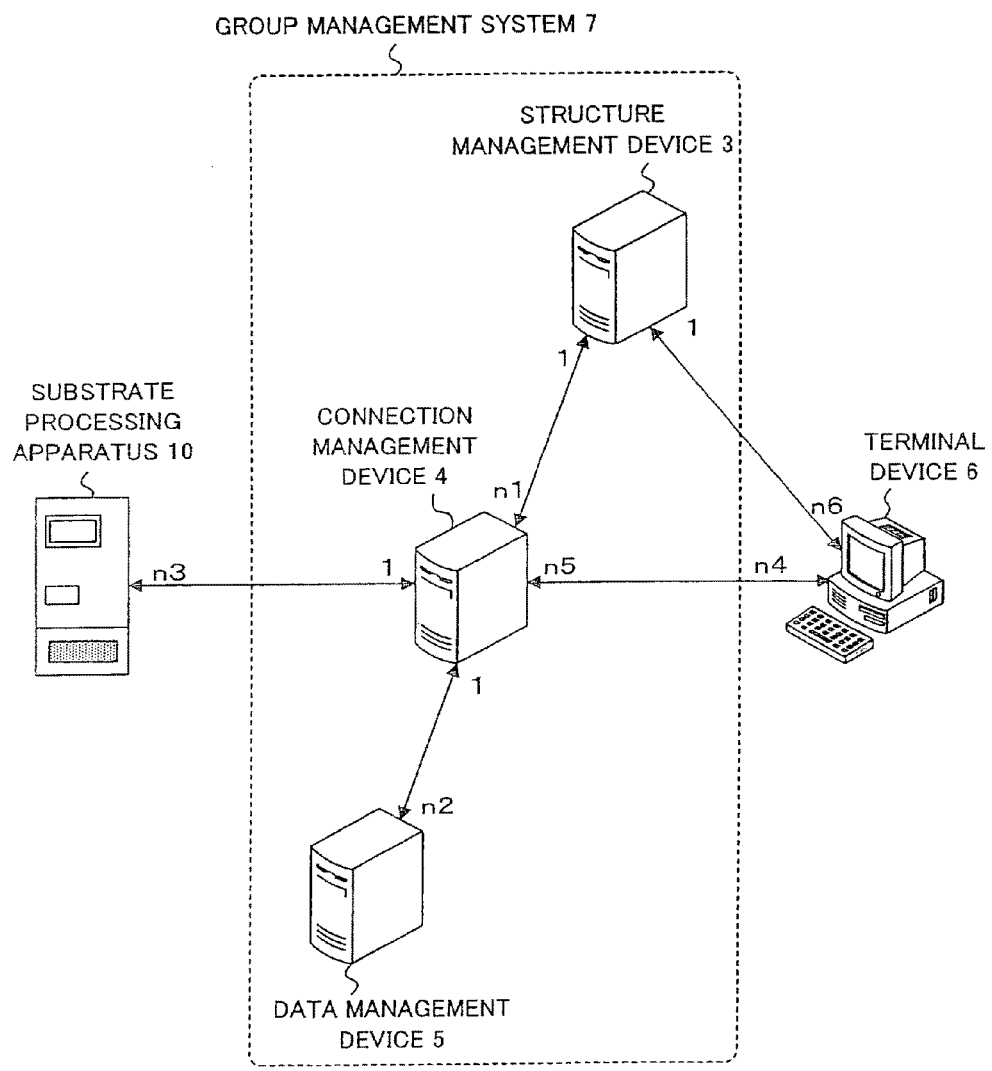
FIG. 8 is a diagram for illustrating hardwares communicating with one another and the number of connections in the substrate processing system 2.

FIG. 8 is a diagram for illustrating the hardwares performing communication with one another and the number of connections in the substrate processing system 2. The numerical values indicated in the drawing represent upper limits of the hardwares to be connected. As used herein, n1 to n6 are integers of 1 or larger and predetermined values.

As shown in FIG. 8, the structure management device 3 performs communication with the plural connection management devices 4 having the upper limit value of n1. The connection management device 4 performs communication with the plural data management devices 5 having the upper limit value of n2, the substrate processing apparatuses 10 having the upper limit value of n3 and the plural terminal devices 6 having the upper limit value of n4. The substrate processing apparatus 10 and the data management device 5 perform communication with one predetermined connection management device 4 among the plural connection management devices 4. Also, the plural terminal devices 6 perform communication with one structure management device 3 and the plural connection management devices 4 having the upper limit value of n5.

FIG. 9 is a diagram showing one example of upper limit parameter table containing the hardwares and the upper limit values (number of maximum connections) each of which indicates the number of hardwares to be connected with each of the hardwares for performing communication.

As in the example shown in FIG. 9, the upper limit parameter table contains the maximum values each of which indicates the number of hardwares to be connected to each of the hardwares. The upper limit parameter table is memorized in the structure management device 3 and edited via the display/input device 24 connected to the structure management device 3. That is, the maximum values contained in the upper limit parameter table are values that can be changed by the user. The upper limit parameter table may be changed when the data inputted via the display/input device 24 of the terminal device 6 are sent to the structure management device 3 via the network 12. Also, the upper limit parameter table may be included in the structure information.

For example, in the substrate processing system 2, the structure management device 3 performs communication as being connected to eight connection management devices 4 at the maximum. Each of the connection management devices 4 performs communication as being connected to one structure management device 3, eight data management devices 5 at the maximum, and thirty-two substrate processing apparatuses 10 at the maximum. Also, each of the data management devices 5 performs communication as being connected to one connection management device 4.

The connection relationships of the hardwares are managed by the structure information memorized in the structure management device 3.

FIG. 10 is a diagram showing one example of the structure information memorized in the structure management device 3.

As in the example shown in FIG. 10, the structure information is described with the XML (Extensible Markup Language) format. In the structure information, settings (type, name, address (position information)) of the structure management device 3 are described in a region indicated by the arrow A in the drawing, settings (type, name, address (position information)) of the connection management device 4 are described in a region indicated by the arrow B in the drawing, and settings (type, name, address (position information)) of the data management device 5 are described in a region indicated by the arrow C in the drawing. Also, settings (type, name, address (position information)) of a connection structure between the substrate processing apparatus 10 and the group management system 7 are described in a region indicated by the arrow D in the drawing.

In this example, a nodes tag indicates that setting information of the structure management device 3, the connection management device 4, and the data management device 5 are described. A node tag indicates the setting information of each of the hardwares, and a node type of the node tag indicates the type of the hardware. For example, GDB indicates that the hardware is the structure management device 3, EDS indicates that the hardware is the connection management device 4, and EDB indicates that the hardware is the data management device 5. A node_id of the tag is an identifier for uniquely identifying each of the hardwares of the type. A node_name tag indicates the name of the hardware. An ip_addr tag indicates an ip address set to the hardware.

Therefore, in the region indicated by the arrow A, it is described that: the type of the hardware is the structure management device 3 (GDB); the name of the hardware is GDB; and the ip address set to the hardware is 192.168.11.1. Also, in the region indicated by the arrow B, it is described that: the type of the hardware is the connection management device 4 (EDS); the identifier in the connection management device 4 is 1; the name of the hardware is EDS#2; and the ip address set to the hardware is 192.168.11.2. Also, in the region indicated by the arrow C, it is described that; the type of the hardware is the data management device 5 (EDB); the identifier in the data management device 5 is 1; the name of the hardware is EDB#2; and the ip address set to the hardware is 192.168.11.10.

Further, in this example, an eq tag indicates setting information of the substrate processing apparatus 10, and eq_type of the tag indicates the type of the substrate processing apparatus 10. An eq_name tag indicates the name of the substrate processing apparatus 10. An eds_name tag indicates the name of the connection management device 4 to which the substrate processing apparatus 10 is connected to perform communication, and edb_name indicates the name of the data management device 5 that is connected to the connection management device 4 indicated by the eds_name for accumulating information relating to the substrate processing apparatus 10. As used herein, the names indicated in the eds_name tag and the edb_name tag are the names indicated by the node_name tag. Also, an eq_addr tag indicates an ip address set to the substrate processing apparatus 10.

Therefore, in this example, it is described that: the type of the substrate processing apparatus 10 is system 1; the name of the hardware is apparatus 1; the substrate processing apparatus 10 is connected to the connection management device 4 named EDS#2 to perform communication with the connection management device 4; and the data management device 5 named EDB#1 is connected to the connection management device 4 so that the information relating to the substrate processing apparatus 10 is accumulated in the data management device 5.

The names of the tags, setting contents, and the like are not limited to those described in this example. Also, the description format of the structure information is not limited to the XML format and may be any format insofar as the format enables the connection structure of the hardware to be described as data. Each of the EDS and EDB may be plural. Such structure information is edited by a text edit software (not shown). The text edit software operates on the structure management device 3 for reading the structure information memorized in the structure management device 3, displaying the structure information on the screen, and receiving edit contents.

Figure 11:
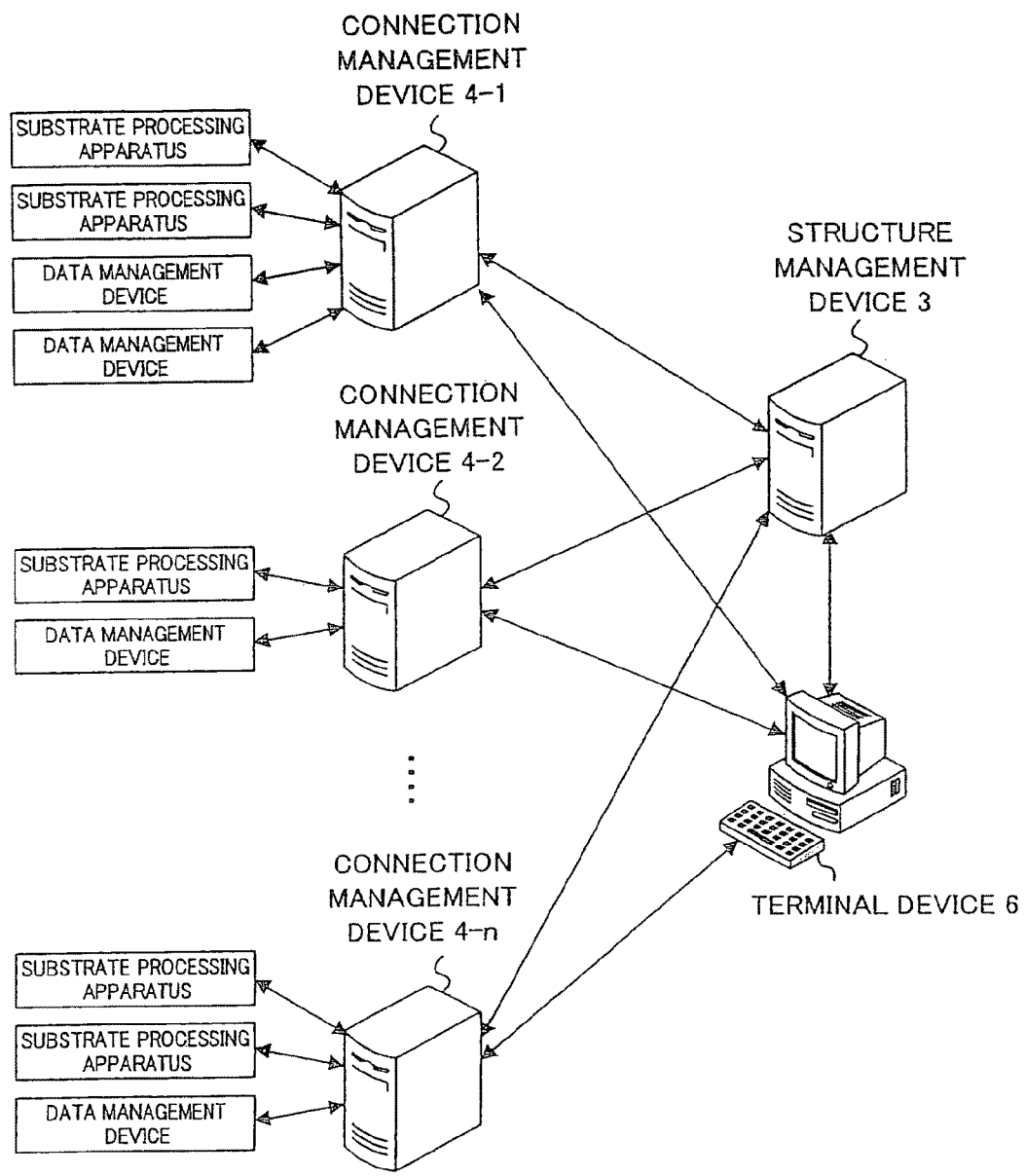
FIG. 11 is a diagram schematically showing one example of a connection relationship formed based on the structure information.

FIG. 11 is a diagram schematically showing one example of the connection relationship formed based on the structure information.

As in the example shown in FIG. 11, the structure management device 3 is connected to and performs communication with the connection management devices 4-1 to 4-n. For example, the connection management device 4-1 is connected to and performs communication with the structure management device 3, two substrate processing apparatuses 10, and two data management devices 5 for accumulating information relating to the two substrate processing apparatuses 10. Also, the connection management device 4-2 is connected to and performs communication with the structure management device 3, one substrate processing apparatus 10, and one data management device 5.

The terminal device 6 is connected to and performs communication with the structure management device 3 and the connection management devices 4-1 to 4-n. Therefore, the terminal device 6 acquires information relating to the substrate processing apparatuses 10 connected to the connection management devices 4-1 to 4-n from the data management devices 5 connected to the connection management device 4-1 to 4-n to display the information on the screen. Accordingly, the user views the information relating to the substrate processing apparatuses 10 via the terminal device 6. The terminal device 6 may acquire and display information relating to the substrate processing apparatuses 10 included in the structure information.

In the substrate processing system 2 according to the embodiment of this invention, the information relating to the substrate processing apparatuses 10 and viewable by the users is set for each of the users.

Figure 12:
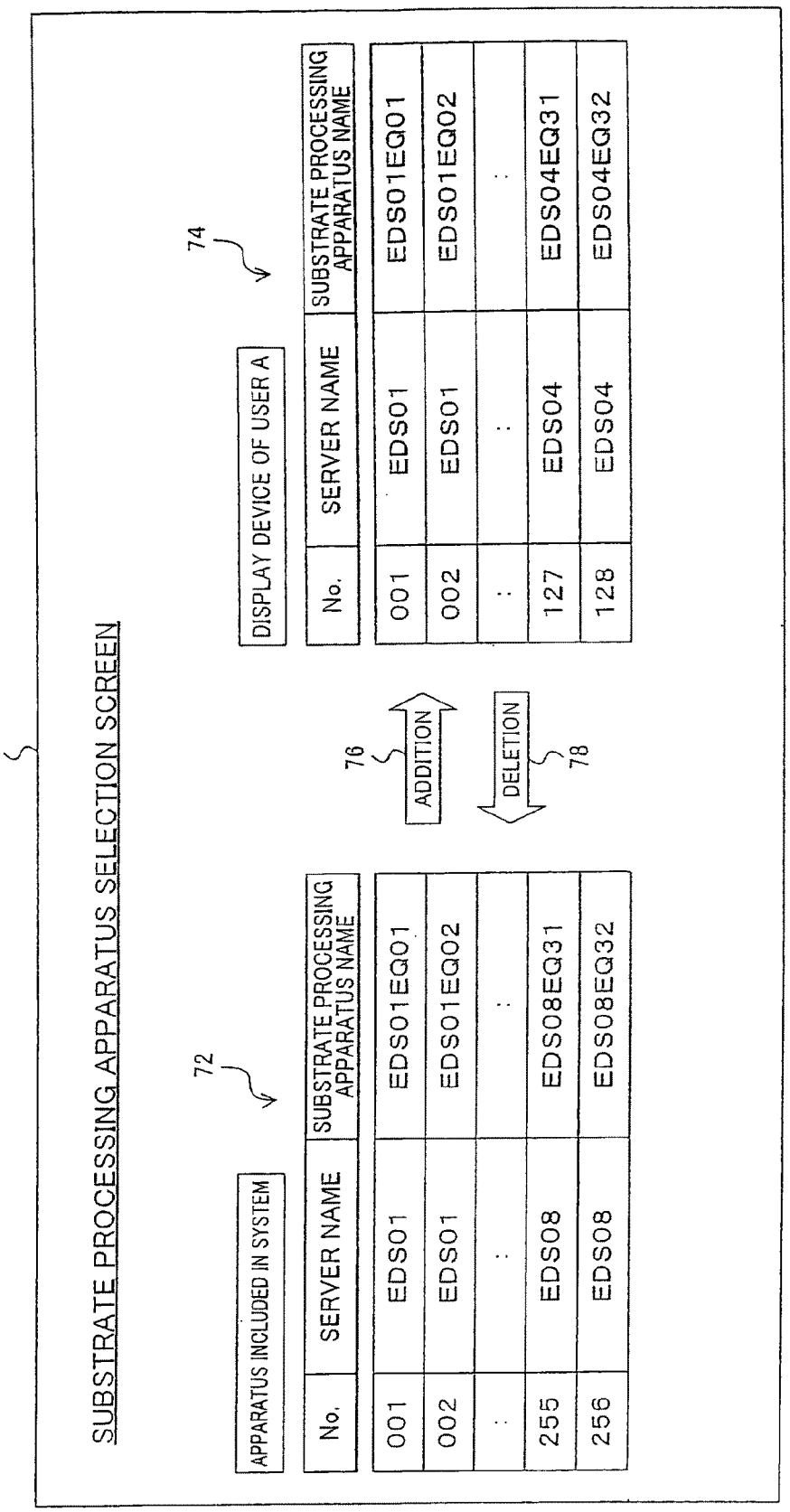
FIG. 12 is a diagram showing a substrate processing apparatus selection screen 70 used for setting authorization for viewing information relating to the substrate processing apparatuses 10 for each of users.

As shown in FIG. 12, the users can view the information relating to the substrate processing apparatuses 10 connected to the connection management device 4-1 and the information relating to the substrate processing apparatuses 10 connected to the connection management device 4-n via the terminal device 6, for example. The viewing authorization is memorized in the structure management device 3. When the user logs in the terminal device 6, the terminal device 6 confirms the viewing authorization memorized in the structure management device 3.

FIG. 12 is a diagram showing a substrate processing apparatus selection screen 70 for setting the authorization for viewing the information relating to the substrate processing apparatuses 10 for each of the users.

As shown in FIG. 12, the substrate processing apparatus selection screen 70 includes an apparatus list display region 72, a viewable apparatus display region 74, an add button 76, and a delete button 78. In the apparatus list display region 72, a list of substrate processing apparatuses 10 included in the substrate processing system 2, e.g. 256 substrate processing apparatuses 10, is displayed. In this example, an identification number of the substrate processing apparatus 10, a name of the substrate processing apparatus 10, and a name of the connection management device 4 (server name) to which the substrate processing apparatus 10 is connected are displayed for each of the substrate processing apparatuses 10.

In the viewable apparatus display region 74, identification numbers of the substrate processing apparatuses 10 that are included in the substrate processing system 2 and viewable by the object user, names of the substrate processing apparatuses 10, and names of the connection management devices 4 to which the substrate processing apparatuses 10 are connected are displayed.

The add button 76 is used for adding the substrate processing apparatus 10 selected on the apparatus list display region 72 to the viewable apparatus display region 74. When the substrate processing apparatus 10 is added to the viewable apparatus display region 74, the user can view the information relating to the added substrate processing apparatus 10. The delete button 78 is used for deleting the substrate processing apparatus 10 selected in the viewable apparatus display region 74 from the viewable apparatus display region 74. When the substrate processing apparatus 10 is deleted from the viewable apparatus display region 74, the user cannot view the information relating to the deleted substrate processing apparatus 10.

The substrate processing apparatus selection screen 70 is displayed on the display/input device 24 of the structure management device 3, and the set contents are memorized in the structure management device 3. The substrate processing apparatus selection screen 70 is displayed on the display/input apparatus 24 of the terminal device 6, and the viewing authorization may be set in such a manner that the data inputted via the display/input device 24 of the terminal device 6 are sent to the structure management device 3 via the network 12.

For example, in the case where it is set that the user A can view the information relating the 1st to 128th substrate processing apparatuses 10 and that the user B can view the information relating to the 129th to 256th substrate processing apparatuses 10, a list of the 128 substrate processing apparatuses 10 for which the user A is authorized to view among the 256 substrate processing apparatuses 10 is displayed on the screen when the user A logs in the terminal device 6. Though not described in detail, it is needless to mention that both of the users A and B can view the information relating to the identical substrate processing apparatuses 10.

Hereinafter, a program operating on the hardwares included in the substrate processing system 2 according to the embodiment of this invention will be described based on FIGS. 13 to 16.

Figure 13:
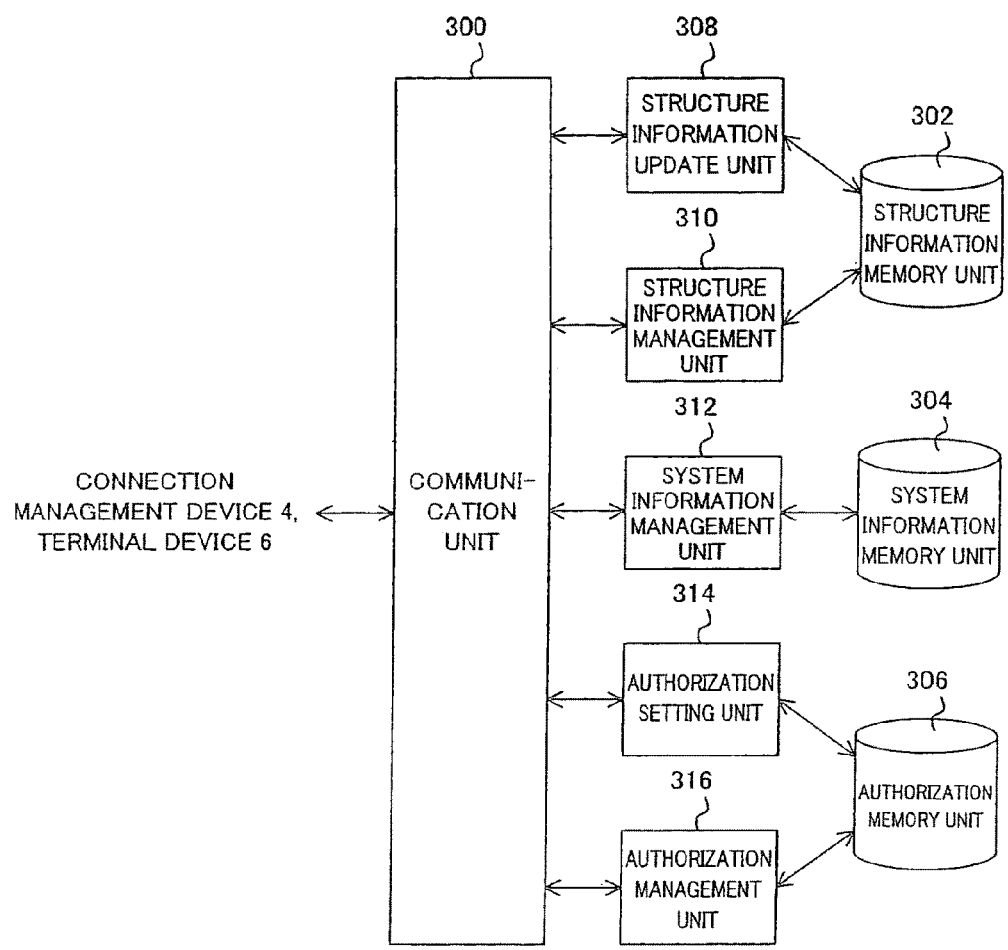
FIG. 13 is a diagram for illustrating a function structure of a structure management program 30 executed by the structure management device 3.

FIG. 13 is a diagram for illustrating a function structure of the structure management program 30 executed by the structure management device 3.

As shown in FIG. 13, the structure management program 30 has a communication unit 300, a structure information memory unit 302, a system information memory unit 304, an authorization memory unit 306, a structure information update unit 308, a structure information management unit 310, a system information management unit 312, an authorization setting unit 314, and an authorization management unit 316. The structure management program 30 is stored in the memory device 26 via a memory medium 28 (FIG. 7) such as an FD, a CD, and a DVD to be supplied to the structure management device 3 and loaded on a memory 20 to be executed on an OS (not shown) operating on the control device 16. The structure management program may be supplied to the control device 16 via the communication IF 22 from an external computer connected to the network 12. Also, the programs described later in this specification are supplied to the hardwares in the same manner to be executed.

In the structure management program 30, the communication unit 300 performs communication processing required for communication with the hardwares. Specifically, the communication unit 300 converts the data generated by the components of the structure management program 30 into a format appropriate for communication processing and outputs the converted data to the network 12 via the communication IF 22. The communication unit 300 outputs the data in the predetermined format and received from the network 12 to other components.

The structure information memory unit 302 memorizes the structure information (FIG. 10) of the substrate processing system 2 to which the structure management device 3 is included and the upper limit parameter table (FIG. 9). The structure information memory unit 302 is realized by at least one of the memory 20 and the memory device 26.

The system information memory unit 304 memorizes shared information such as failure information that is shared in the substrate processing system 2. The authorization memory unit 306 memorizes the viewing authorization set for each of the users via the substrate processing apparatus selection screen 70 (FIG. 12). The system information memory unit 304 and the authorization memory unit 306 are realized in the same manner as the structure information memory unit 302.

The structure information update unit 308 receives an update operation such as addition and deletion of the structure information performed via the structure management device 3 or the display/input device 24 of the terminal device 6 and updates the structure information memorized in the structure information memory unit 302 based on the updated contents. Also, the structure information update unit 308 receives an update operation of the upper limit parameter table and updates the upper limit parameter table memorized in the structure information memory unit 302 based on the updated contents in the same manner.

The structure information management unit 310 receives a reference request for the structure information from other hardwares such as the terminal device 6 and the connection management device 4 and sends the structure information memorized in the structure information memory unit 302 to the requestor hardware.

The system information management unit 312 receives from the connection management device 4 the shared information sent from the substrate processing apparatus 10 to the connection management device 4 and stores the shared information in the system information memory unit 304.

The authorization setting unit 314 refers to the viewing authorization memorized in the authorization memory unit 306 to display the substrate processing apparatus selection screen 70 on the display/input device 24 and receives the setting contents inputted via the screen to update the viewing authorization memorized in the authorization memory unit 306 based on the setting contents.

The authorization management unit 316 receives a reference request for the viewing authorization from the terminal device 6 and sends the viewing authorization memorized in the authorization memory unit 306 to the requestor terminal device 6.

Figure 14:
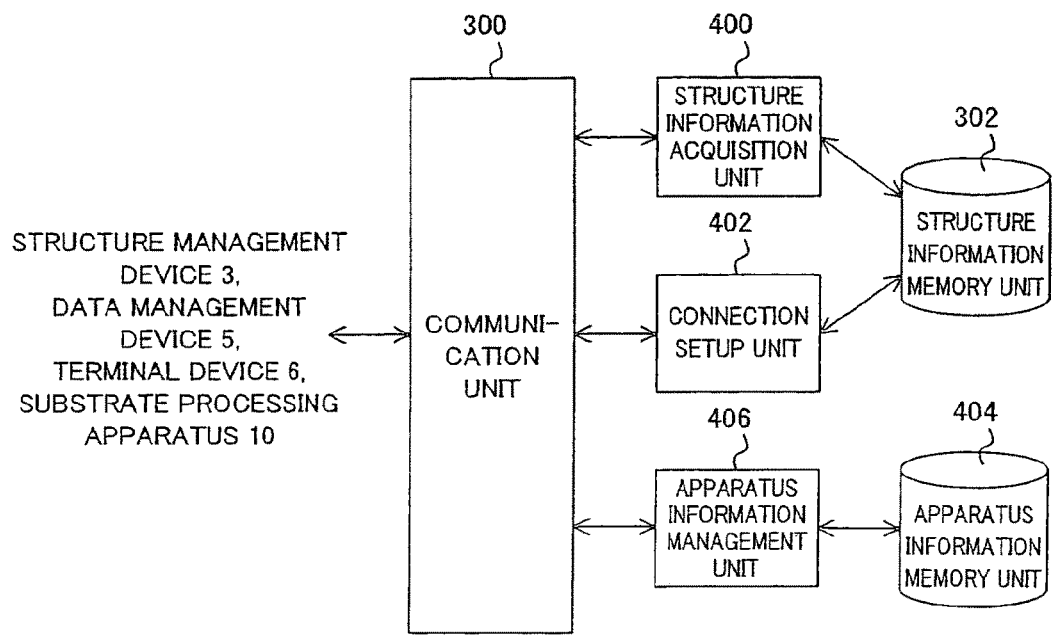
FIG. 14 is a diagram for illustrating a function structure of a connection management program 40 executed by a connection management device 4.

FIG. 14 is a diagram for illustrating a function structure of a connection management program 40 executed by the connection management device 4.

As shown in FIG. 14, the connection management program 40 has a communication unit 300, a structure information memory unit 302, a structure information acquisition unit 400, a connection setup unit 402, an apparatus information memory unit 404, and an apparatus information management unit 406. Among the components shown in FIG. 14, those having substantially the same structure as those shown in FIG. 13 are denoted by the same reference numerals.

In the connection management program 40, the structure information acquisition unit 400 requests the structure management device 3 for structure information after the connection management device 4 has started up and receives the structure information sent from the structure management device 3 to store the structure information in the structure information memory unit 302.

The connection setup unit 402 sets up connection between the substrate processing apparatus 10 and the data management device 5 based on the structure information memorized in the structure information memory unit 302 when the structure information is acquired from the structure information acquisition unit 400. More specifically, the connection setup unit 402 recognizes the connection structure based on the names of the hardwares described in the structure information to set up the connection between the hardwares having the names.

The apparatus information memory unit 404 memorizes information relating to the substrate processing apparatus 10 sent from the substrate processing apparatus 10 connected to the connection management device 4. This information includes information relating to an operation state of the apparatus including temperature information, pressure information, and gas flow rate information. The apparatus information memory unit 404 is realized by at least one of the memory 20 and the memory device 26.

The apparatus information management unit 406 receives the information relating to the substrate processing apparatus 10 sent from the substrate processing apparatus 10 connected to the connection management device 4 to store the information in the apparatus information memory unit 404. The apparatus information management unit 406 sends the information included in the received information and having low generation frequency, such as failure information, to the structure management device 3. Further, the apparatus information management unit 406 sends the information having high generation frequency, such as the temperature information and the pressure information, to the data management device 5 connected to the connection management device 4. Alternatively, such information may be sent to each of the structure management device 3 and the data management device 5 without being stored in the apparatus information memory unit 404. Also, various modes such as a mode of directly sending the information from the apparatus information management unit 406 only to the structure management device 3 may be employed.

Figure 15:
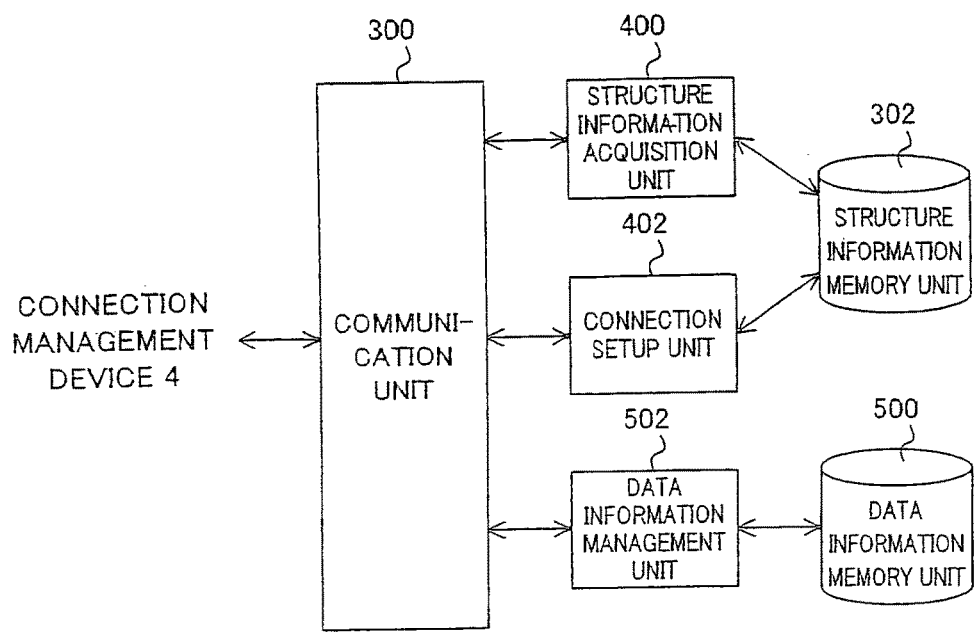
FIG. 15 is a diagram for illustrating a function structure of a data management program 50 executed by a data management device 5.

FIG. 15 is a diagram for illustrating a function structure of a data management program 50 executed by the data management device 5.

As shown in FIG. 15, the data management program 50 has a communication unit 300, a structure information memory unit 302, a structure information acquisition unit 400, a connection setup unit 402, a data information memory unit 500, and a data information management unit 502. Among the components shown in FIG. 15, those having the substantially same structure as those shown in FIGS. 13 and 14 are denoted by the same reference numerals.

In the data management program 50, the data information memory unit 500 memorizes information relating to the substrate processing apparatus 10 connected to the connection management device 4 to which the data management device 5 is connected. The information includes temperature information, pressure information, and the like. The data information memory unit 500 is realized by at least one of the memory 20 and the memory device 26.

The data information management unit 502 receives from the connection management device 4 the information sent from the substrate processing apparatus 10 to the connection management device 4 to store the information in the data information memory unit 500.

Figure 16:
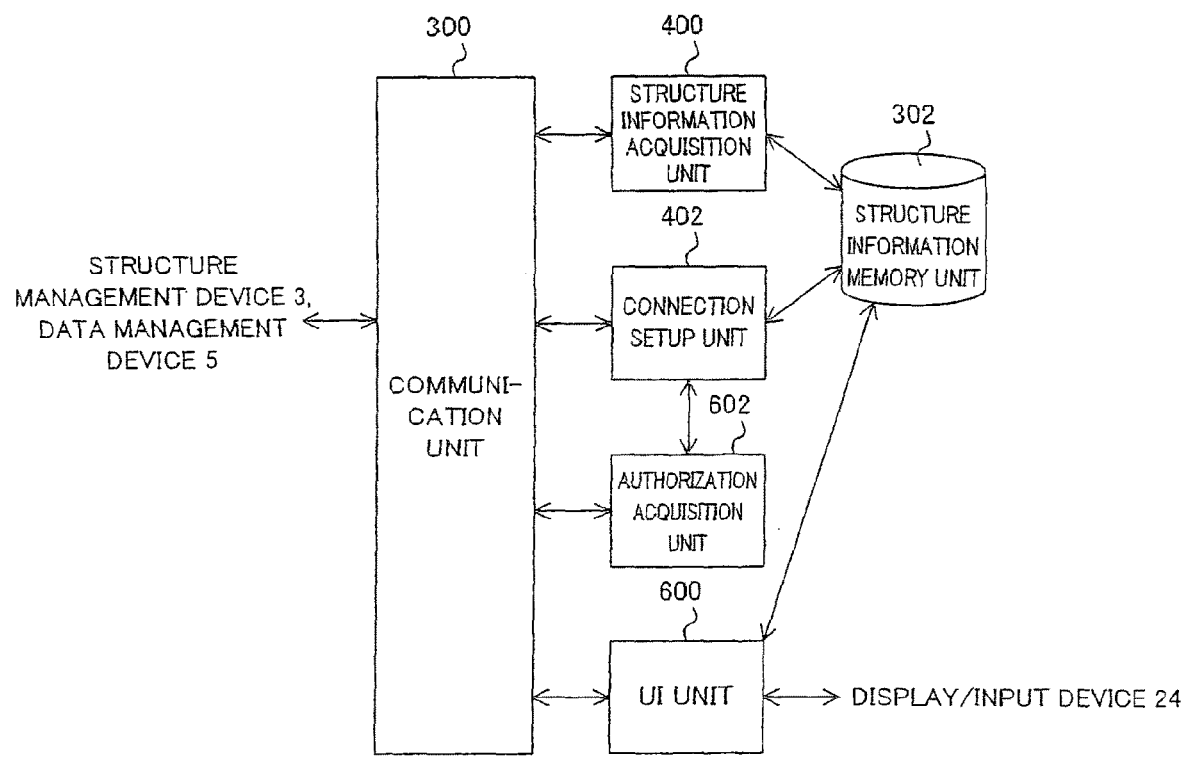
FIG. 16 is a diagram for illustrating a function structure of a terminal program 60 executed by the terminal device 6.

FIG. 16 is a diagram for illustrating a function structure of a terminal program 60 executed by the terminal device 6.

As shown in FIG. 16, the terminal program 60 has a communication unit 300, a structure information memory unit 302, a structure information acquisition unit 400, a connection setup unit 402, a user interface (UI) unit 600, and an authorization acquisition unit 602. Among the components shown in FIG. 16, those having the substantially same structure as those shown in FIGS. 13 and 14 are denoted by the same reference numerals.

In the terminal program 60, the UI unit 600 displays the substrate processing apparatus selection screen 70, a screen (not shown) for updating the structure information and the upper limit parameters, and a screen (not shown) for displaying the information relating to the substrate processing apparatus 10 on the display/input device 24. The UI unit 600 sends contents inputted via the display/input device 24 to other hardwares via the communication unit 300.

The authorization acquisition unit 602 requests the structure management device 3 for authorization of a user when the user logs in the terminal device 6 and receives the authorization sent from the structure management device 3 to output the authorization to the connection setup unit 402. The connection setup unit 402 sets up a connection within the range that the user can access.

Hereinafter, an operation of the substrate processing system 2 according to the embodiment of this invention will be described.

Figure 17:
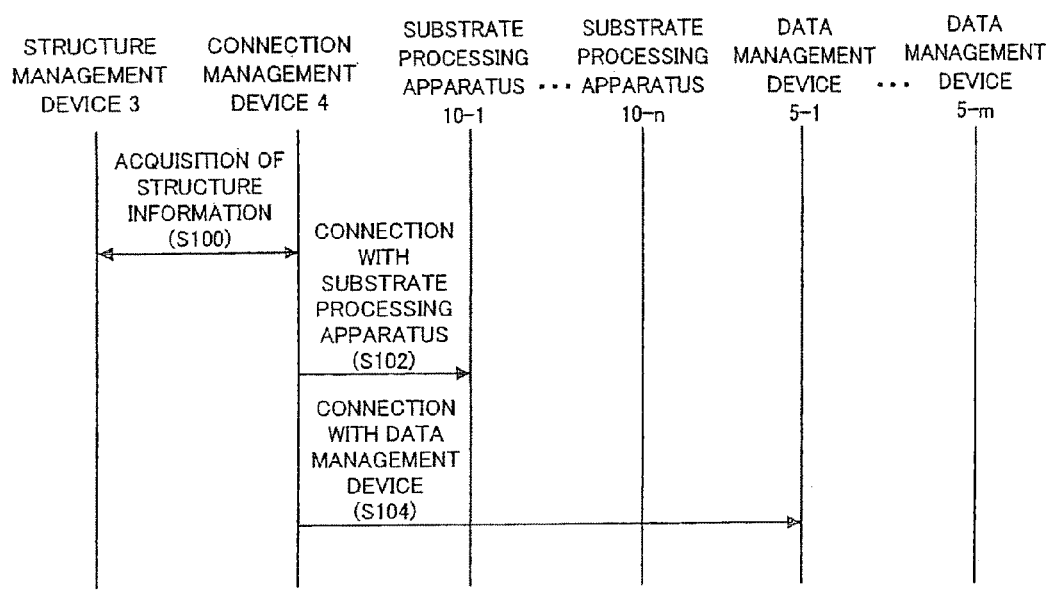
FIG. 17 is a sequence diagram showing an operation (S10) of the connection management device 4 on start-up.

FIG. 17 is a sequence showing an operation (S10) when starting up the connection management device 4.

As shown in FIG. 17, when the connection management device 4 is started up, the connection management program 40 operates on the connection management device 4, and the structure information acquisition unit 400 of the connection management program 40 requests the structure management device 3 to send the structure information in Step 100 (S100). Upon reception of the request at the structure information management unit 310 of the structure management program 30, the structure management device 3 sends the memorized structure information to the connection management device 4. In the connection management device 4, the structure information acquisition unit 400 of the connection management program 40 receives the sent structure information to store the structure information in the structure information memory unit 302.

In Step 102 (S102), the connection setup unit 402 refers to the memorized structure information to recognize at least one substrate processing apparatus 10 for which connection is to be set up and sets up the connection with the substrate processing apparatus 10.

In Step 104 (S104), the connection setup unit 402 recognizes at least one data management device 5 for which connection is to be set up and sets up the connection with the data management device 5.

Likewise, the data management device 5 performs the operation for setting up connection when started up.

Figure 18:
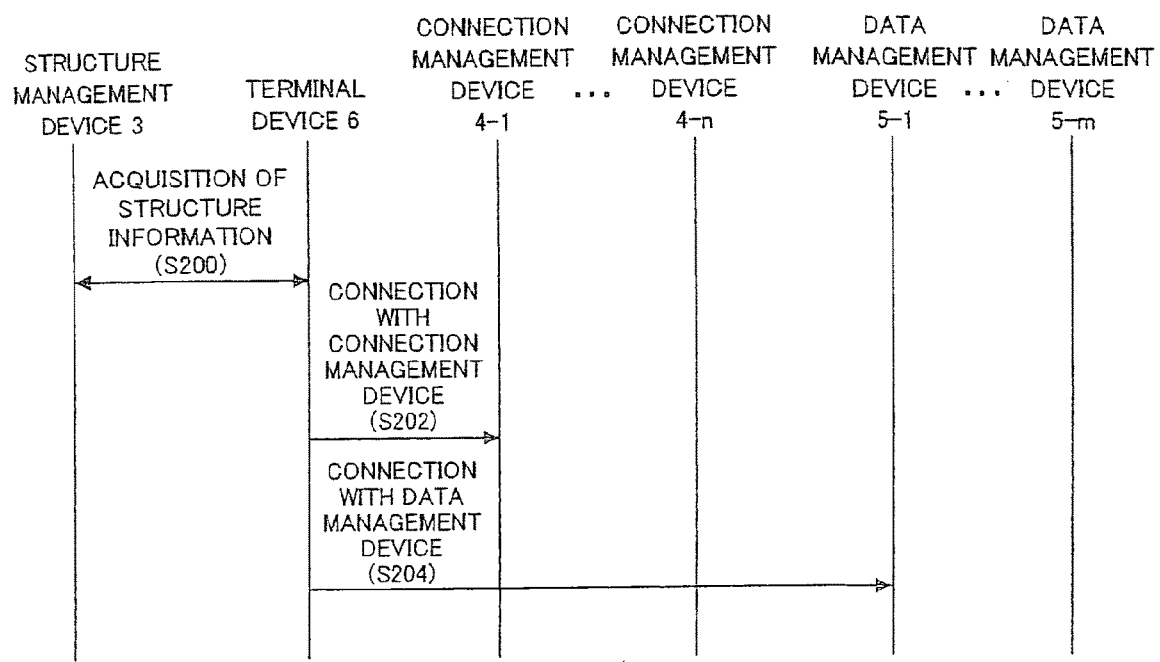
FIG. 18 is a sequence diagram showing an operation (S20) when the information relating to the substrate processing apparatus 10 is viewed by using the terminal device 6.

FIG. 18 is a sequence showing an operation (S20) performed when information relating to the substrate processing apparatus 10 is viewed using the terminal device 6.

As shown in FIG. 18, when a user logs in the terminal device 6, the structure information acquisition unit 400 of the terminal program 60 requests the structure management device 3 for structure information in Step 200 (S200) to acquire the structure information. The authorization acquisition unit 602 requests the structure management device 3 for authorization of the user to acquire the authorization.

In Step 202 (S202), the connection setup unit 402 recognizes at least one connection management device 4 for which connection is to be set up based on the memorized structure information and the authorization acquired from the authorization acquisition unit 602 and sets up the connection with the connection management device 4.

In Step 204 (S204), the connection setup unit 402 recognizes at least one data management device 5 for which connection is to be set up based on the structure information and the authorization and sets up the connection with the data management device 5 via the connection management device 4.

When the connections are set up in the substrate processing system 2 as described above, it is possible to receive or accumulate information about substrate processing executed by the substrate processing apparatus 10.

Hereinafter, the substrate processing by the substrate processing apparatus 10 will be described in detail.

As shown in FIGS. 4 and 5, when the pod 110 is supplied to the load port 114, the pod carrying in/out opening 112 is opened by the front shutter 113, and the pod 110 on the load port 114 is carried into the housing 111 through the pod carrying in/out opening 112 by the pod conveying device 118.

The pod 110 thus carried in is automatically conveyed and delivered to the designated rack 117 of the rotational pod shelf 105 by the pod conveying device 118 to be temporarily stored and then conveyed and delivered to one of the pod openers 121 from the rack 117 to be temporarily stored, followed by being conveyed from the rack 117 to one of the pod openers 121 to be transferred to the placing table 122 or being conveyed directly to the pod opener 121 to be transferred to the placing table 122. In this case, the wafer carrying in/out opening 120 of the pod opener 121 is closed by the cap attaching/detaching mechanism 123, so that the clean air 133 is flown to the transfer chamber 124 to fill up the transfer chamber 124. For example, by filling the transfer chamber 124 with a nitrogen gas as the clean air 133, an oxygen concentration is set to 20 ppm or less which is very much lower than that inside the housing 111 (which is under the atmosphere).

When an opening side end face of the pod 110 placed on the placing table 122 is pressed against an aperture rim of the wafer carrying in/out opening 120 at the front wall 119a of the sub-housing 119, the cap is detached by the cap attaching/detaching mechanism 123 to open the wafer taking in/out opening.

When the pod 110 is opened by the pod opener 121, the wafers 200 are picked up from the pod 110 by the tweezers 125c of the wafer transfer device 125a through the wafer taking in/out opening and aligned by the notch matching device 135 not shown and then carried to the stand-by unit 126 at the rear part of the transfer chamber 124 to be loaded (charging) on the boat 217. The wafer transfer device 125a that has delivered the wafers 200 to the boat 217 returns to the pod 110 to load next wafers 200 to the boat 217.

During the work of loading the wafers to the boat 217 by the wafer transfer mechanism 125 in one of the pod openers 121 (upper or lower pod opener), another pod 110 is conveyed and transferred from the rotational pod shelf 105 to the other pod opener 121 (upper or lower pod opener) by the pod conveying device 118, so that an opening work of the pod 110 by the pod opener 121 is performed simultaneously with the loading work.

When a predetermined number of the wafers 200 are loaded on the boat 217, the lower end of the processing furnace 202 that has been closed by the furnace shutter 147 is opened by the furnace shutter 147. Subsequently, the boat 217 retaining the wafers 200 is carried (loaded) into the processing furnace 202 as the sealing cap 219 being elevated by the boat elevator 115.

After the loading, processing is performed on the wafers 200 based on the predetermined recipe in the processing furnace 202. After the processing, the wafers 200 and the pod 110 are withdrawn outside the housing by a procedure reverse to the above-described procedure except for the wafer alignment step by the notch matching device 135 not shown.

The substrate processing apparatus 10 sends data relating to a state of the substrate processing apparatus 10, such as temperature information and pressure information, to the connection management device 4 during the above-described substrate processing. Further, the substrate processing apparatus 10 sends event information, failure information, and logging information to the connection management device 4.

Hereinafter, a method of reflecting edited structure information to the substrate processing system 2 will be described.

Figure 19:
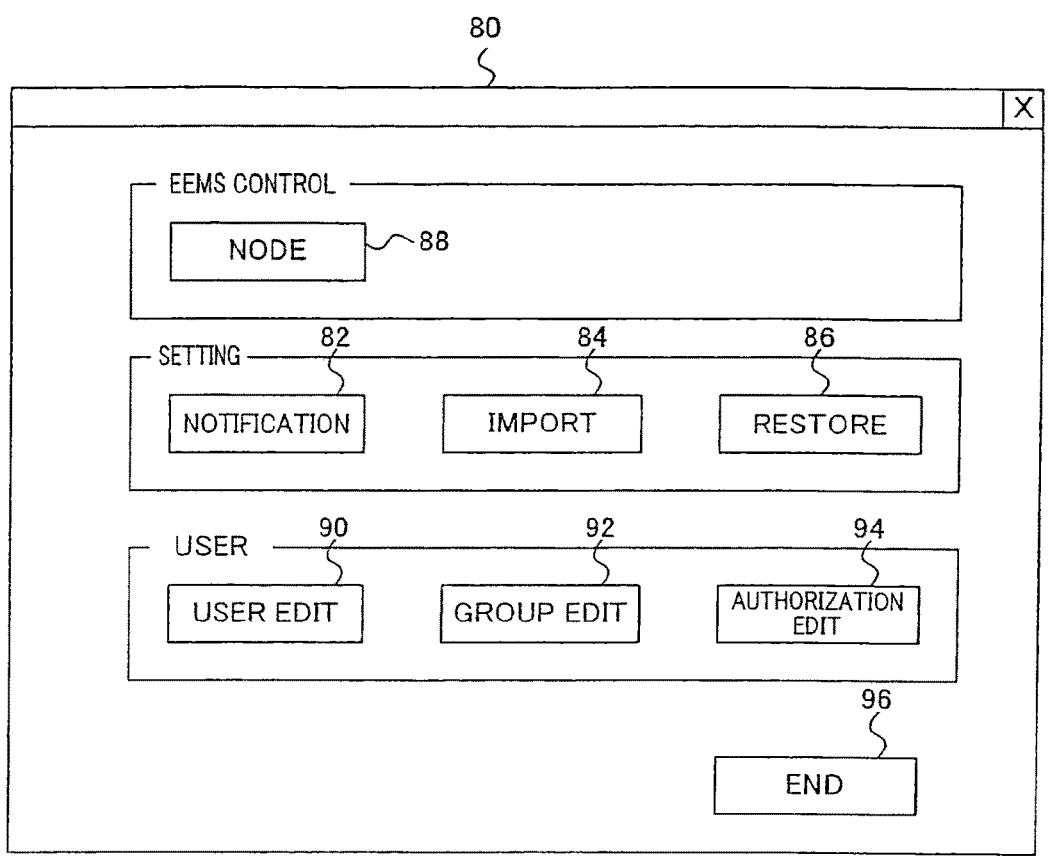
FIG. 19 is a diagram showing one example of a system management screen 80 for managing a system structure of the substrate processing system 2.

FIG. 19 is a diagram showing one example of system management screen 80 for managing a system structure of the substrate processing system 2.

As in the example shown in FIG. 19, the system management screen 80 includes a notification button 82, an import button 84, a restore button 86, a node button 88, a user edit button 90, a group edit button 92, an authorization edit button 94, and a termination button 96. The system management screen 80 is displayed on the display/input device 24 that is connected to the structure management device 3, and the structure management device 3 receives operations inputted via the system management screen 80 by means of, for example, the mouse, the keyboard, and the like.

In the system management screen 80, the import button 84 is used for keeping the structure information to a notifiable state in the structure management device 3. When the import button 84 is pressed, the structure information is updated to the edited contents to be stored in the memory device 26 of the structure management device 3. The notification button 82 is used for changing the connection structure based on the structure information. When the notification button 82 is pressed, structure information change notification is sent to other hardwares such as the connection management device 4. Since the buttons other than the import button 84 and the notification button 82 are not directly relevant to this invention, descriptions thereof are omitted.

Alternatively, the structure information may be updated by displaying the system management screen 80 on the display/input device 24 of the terminal device 6 and sending the set contents inputted via the display/input device 24 of the terminal device 6 to the structure management device 3 via the network 12. In this case, the text edit software also operates on the terminal device 6.

FIG. 20 is a diagram for illustrating a switching operation when a failure occurs in the connection management device 4.

Figure 20A:
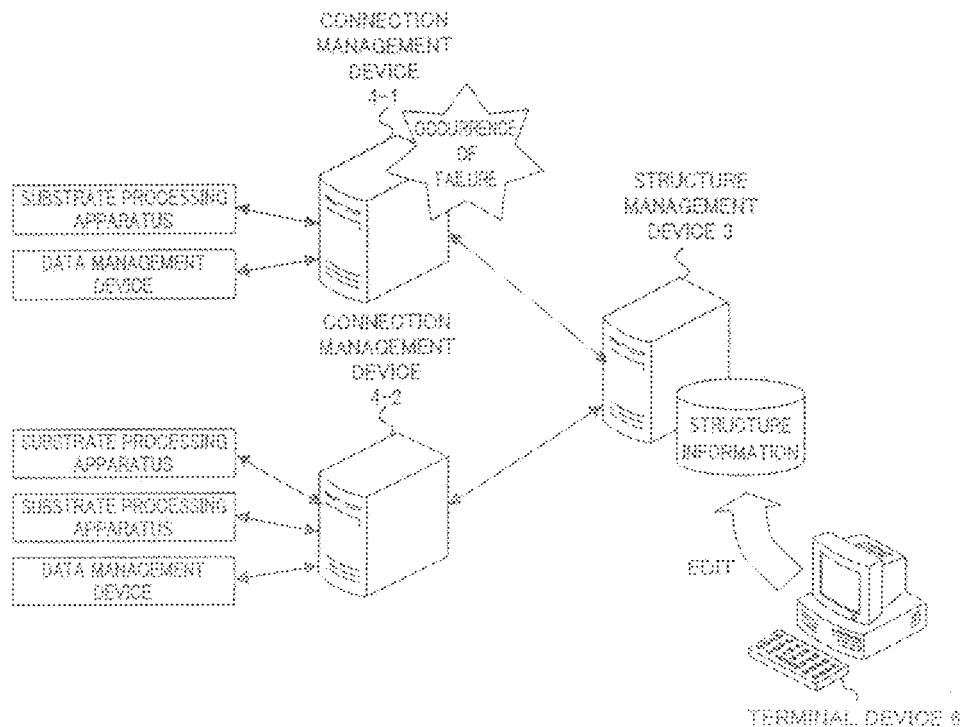
FIG. 20 is a diagram for illustrating a switching operation when a failure occurs in the connection management device 4.

As shown in FIG. 20A, in the case where a failure occurs in the connection management device 4-1, a worker edits the structure information memorized in the structure management device 3 via the display/input device 24 and reflects the edited structure information to the substrate processing system 2 via the system management screen 80. Therefore, the terminal device 6 and the like instruct reflection of the changed structure information and notification to the connection management device 4.

Figure 20B:
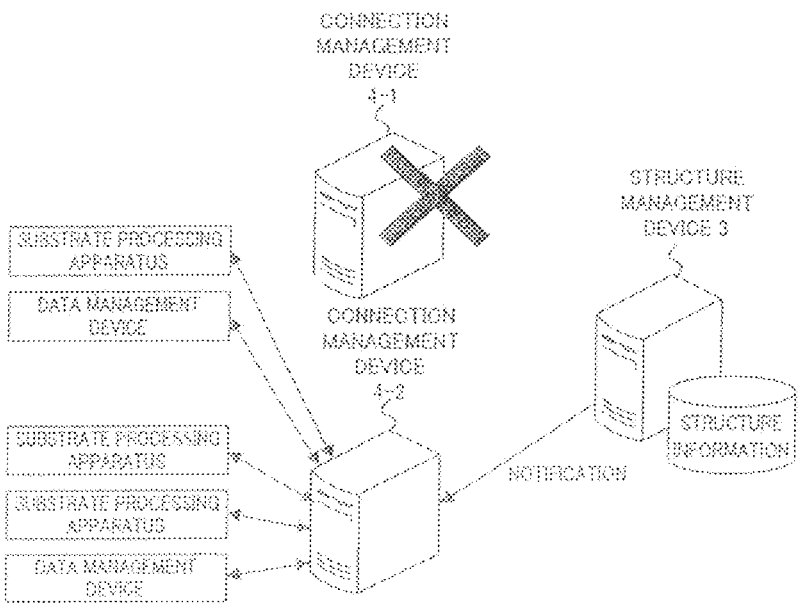

When the notification button 82 is pressed in the system management screen 80, structure information change notification is sent from the structure management device 3 to the connection management device 4-2 as shown in FIG. 20B. Upon reception of the structure information change notification, the connection management device 4-2 acquires the structure information from the structure management device and sets up connection with the substrate processing apparatus 10 and the data management device 5 based on the structure information. Accordingly, the substrate processing apparatus 10 and the data management device 5 that have been connected to the connection management device 4-1 set up the connection with the connection management device 4-2 to perform communication with the connection management device 4-2.

Figure 21:
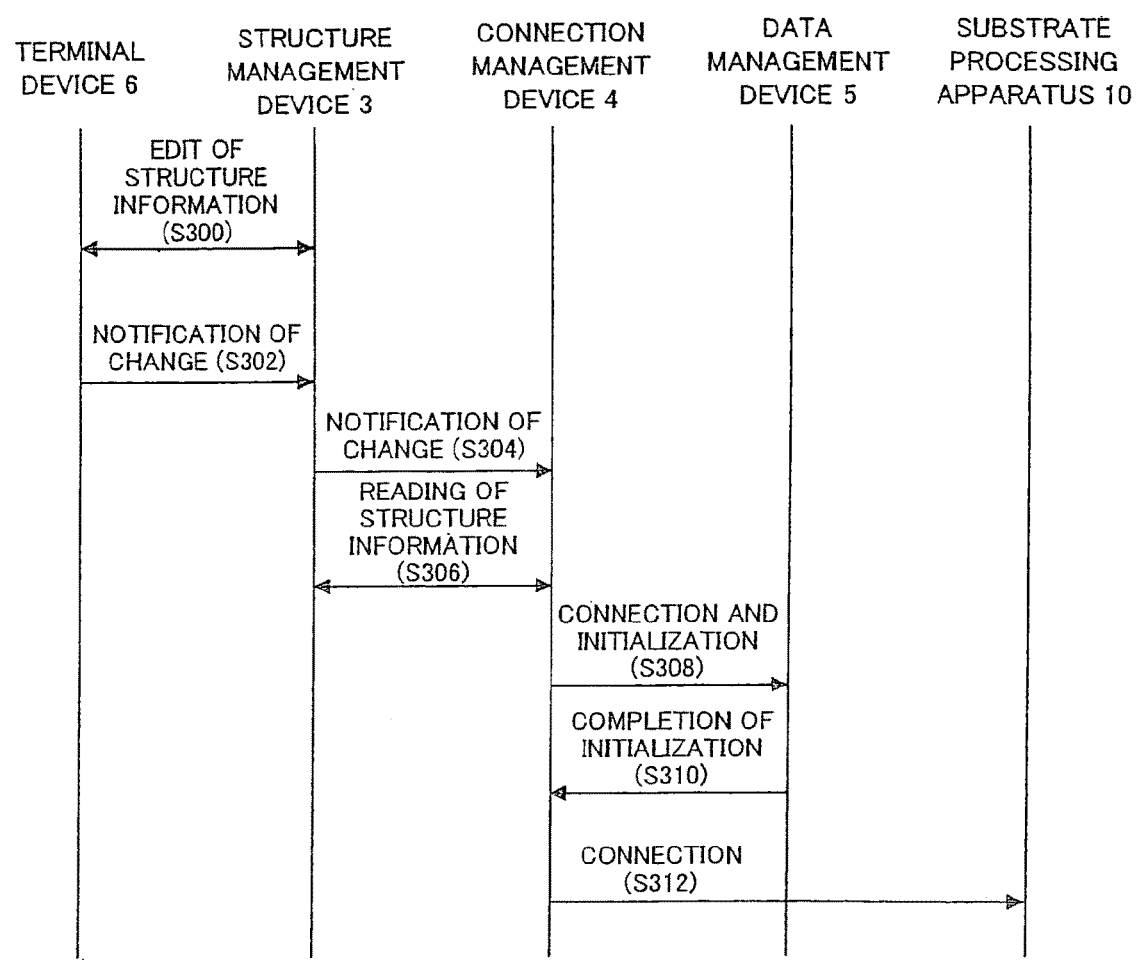
FIG. 21 is a sequence diagram showing a switching operation (S30) in the case where the structure information is updated.

FIG. 21 is a sequence showing a switching operation (S30) in the case where structure information is updated.

As shown in FIG. 21, a user uses the display/input device 24 of the terminal device 6, for example, to edit structure information memorized in the structure management device 3 on the text edit software in Step 300 (S300). When the user presses the import button 84 of the system management screen 80, the structure information update unit 308 of the structure management program 30 operating on the structure management device 3 reflects the updated contents to the structure information memory unit 302.

In Step 302 (S302), when the user presses the notification button 82 of the system management screen 80, the structure information management unit 310 of the structure management program 30 receives structure information change notification from the terminal device 6.

In Step 304 (S304), the structure information management unit 310 sends notification of the change in structure information to the connection management device 4.

In Step 306 (S306), the structure information acquisition unit 400 of the connection management program 40 operating on the connection management device 4 requests the structure management device 3 to send the structure information. In the structure management device 3, the structure information management unit 310 of the structure management program 30 receives the request and sends the memorized structure information to the connection management device 4. In the connection management device 4, the structure information acquisition unit 400 of the connection management program 40 receives the sent structure information to store the structure information in the structure information memory unit 302.

In Step 308 (S308), the connection setup unit 402 refers to the memorized structure information to recognize at least one data management device 5 for which connection is to be set up based on the structure information and sets up the connection with the data management device 5 to execute initialization processing.

In Step 310 (S310), the connection setup unit 402 receives initialization completion notification from the data management device 5.

In Step 312 (S312), the connection setup unit 402 refers to the memorized structure information to recognize at least one substrate processing apparatus 10 for which connection is to be set up based on the structure information and sets up the connection with the substrate processing apparatus 10.

When the connections are set up in the substrate processing system 2, substrate processing is executed by the substrate processing apparatus 10.

As described in the foregoing, since the substrate processing system 2 according to this invention has the plural substrate processing apparatuses 10 for processing substrates and the group management system 7 connected to the substrate processing apparatuses 10, and the group management system 7 has the structure information memory device (structure management device 3) for memorizing the structure information, the plural communication devices (connection management devices 4) each performing communication with at least one of the plural substrate processing apparatuses based on the structure information memorized in the structure information memory device, and the apparatus information storage device (data management device 5) that is connected to any of the plural communication devices based on the structure information memorized in the structure information memory device and stores information relating to the substrate processing apparatus performing communication with the communication device. Therefore, in the case where the number of the substrate processing apparatuses to be connected is increased, it is possible to connect with the multiple of substrate processing apparatuses without increasing the number of the group management apparatus according to this invention. Also, since it is unnecessary to increase the number of the group management apparatus even when a substrate processing apparatus is added, it is possible to realize a reduced cost.

Preferably, the structure information includes a connection relationship among the substrate processing apparatuses, the structure information memory device, the communication device, and the apparatus information storage device. According to this invention, it is possible to easily change and expand the devices to be connected, thereby making it possible to shorten time required for maintenance. Thus, it is possible to improve an operation rate of the substrate processing system.

The structure information includes the maximum connection numbers indicating the maximum numbers of the structure management device 3, the connection management device 4, and the data management device 5 to be connected to one another, and the substrate processing system 2 further includes a setting unit for setting the maximum connection numbers. Therefore, since it is possible to increase the hardwares in the substrate processing system 2 by changing the maximum connection numbers, it is possible to perform structure change in the more simplified manner. Particularly, in the case where the performance of the hardware is improved in future, it is possible to improve specification of the whole system only by changing the parameters. Also, it is possible to realize the structure change at a lower cost.

Since the structure information is centrally controlled in the structure management device 3, each of the hardwares recognizes the connection structure by acquiring the structure information from the structure management device 3 at the start-up. Therefore, it is possible to fix the start-up sequence in each of the hardwares.

Also, in the structure information, the unique name is assigned to each of the hardwares, and the connection mode is defined by the name. Therefore, it is possible to deal with structure change only by changing the name of the hardware. Thus, it is possible to diminish time required for the structure change, hardware replacement, and the like.

The structure management device 3 stores information that is the information relating to the plural substrate processing apparatuses 10 and different from the information stored in the data management device 5. Particularly, the structure management device 3 stores the information having a low generation frequency, and the data management device 5 stores the information having a high generation frequency. Therefore, in the case where a load on the whole substrate processing system 2 is increased, it is possible to improve performance of the whole substrate processing system 2 only by adding a data management device 5 without reviewing the structure of the whole system.

For example, in the case where a substrate processing apparatus 10 generates information relating to the substrate processing apparatus 10 more frequently to increase a load on the data management device 5 storing the information relating to the substrate processing apparatus 10, it is possible to reduce a load on the data management device 5 by instantly expanding the system by increasing the number of the data management devices 5 for storing the information relating to the substrate processing apparatus 10.

Preferably, the substrate processing system 2 further includes a display unit for displaying information relating to the substrate processing apparatuses included in the structure information. In the substrate processing system 2 according to this invention, the authorization for viewing the information relating to the substrate processing apparatuses 10 using the terminal device 6 is set for each of the users and memorized in the structure management device 3. Therefore, even in the case where the upper limit (e.g. 128) is set to the number of substrate processing apparatuses 10 that the terminal device 6 can access, it is possible to view the information relating to the substrate processing apparatuses 10 exceeding the upper limit value by increasing the number of users to 2 or more. Preferably, the substrate processing system 2 further includes an instruction unit for instructing reflection of the changed structure information and notification to the communication device.

The substrate processing apparatus 10 according to this invention is applicable to apparatuses for processing glass substrates, such as an LCD apparatus, in addition to the semiconductor production apparatuses. Also, the substrate processing apparatus 10 according to this invention does not limit the processing inside the furnace, and it is possible to perform film formation processing such as CVD, PVD, processing for forming oxide films and nitride films, and processing for forming films containing a metal. Also, the substrate processing apparatus 10 according to this invention may be adapted to sheet feeding apparatuses without limitation to the vertical apparatuses.

What is claimed is:

1. A substrate processing system comprising:
a plurality of substrate processing apparatuses for processing substrates; and
a group management system connected to the plurality of substrate processing apparatuses, wherein
the group management system comprises:
a structure information memory device for memorizing structure information defining a connection structure and for memorizing an upper limit parameter table, the upper limit parameter table containing a plurality of upper limit values, each one of the plurality of upper limit values indicating a number of hardware devices to be connected with each hardware device for performing communication;
a plurality of communication devices each of which communicates with at least one of the plurality of substrate processing apparatuses based on the structure information; and
an apparatus information storage device connected to any of the plurality of communication devices based on the structure information and stores information relating to each of the plurality of substrate processing apparatuses communicating with any of the plurality of communication devices, wherein
the structure information comprises the plurality of upper limit values indicating a number of maximum connections between each of the structure information memory device, the plurality of communication devices, and the apparatus information storage device.

2. The substrate processing system according to claim 1, wherein
the structure information comprises a connection relationship among the plurality of substrate processing apparatuses, the structure information memory device, the plurality of communication devices, and the apparatus information storage device.

3. The substrate processing system according to claim 1, wherein the structure information memory device stores information relating to the plurality of substrate processing apparatuses and different from the information stored in the apparatus information storage device.

4. The substrate processing system according to claim 1, further comprising:
a display unit for displaying the information relating to the plurality of substrate processing apparatuses included in the structure information.

5. The substrate processing system according to claim 1, further comprising:
an instruction unit for instructing reflection of the structure information changed and notification to the plurality of communication devices.

6. A group management system connected to a plurality of substrate processing apparatuses for processing substrates, comprising:
a structure information memory device for memorizing structure information defining a connection structure in the group management system and for memorizing an upper limit parameter table, the upper limit parameter table containing a plurality of upper limit values, each one of the plurality of upper limit values indicating a number of hardware devices to be connected with each hardware device for performing communication;
a plurality of communication devices each of which communicates with at least one of the plurality of substrate processing apparatuses based on the structure information; and
an apparatus information storage device connected to any of the plurality of communication devices based on the structure information and which stores information relating to each of the plurality of substrate processing apparatuses communicating with any of the plurality of communication device, wherein
the structure information comprises the plurality of upper limit values indicating a number of maximum connections between each of the structure information memory device, the plurality of communication devices, and the apparatus information storage device.

7. The group management system according to claim 6, wherein
the structure information indicates a connection relationship at least among the apparatus information storage device, the structure information memory device, the plurality of communication devices, and the plurality of substrate processing devices.

8. The group management system according to claim 6, wherein
the structure information memory device stores information relating to the plurality of substrate processing apparatuses and different from the information stored in the apparatus information storage device.

* * * * *